US008757341B2

(12) United States Patent
Klieber

(10) Patent No.: US 8,757,341 B2
(45) Date of Patent: Jun. 24, 2014

(54) HUB WITH STAR RATCHET

(76) Inventor: Jochen Klieber, Tacherting (DE)

( * ) Notice: Subject to any disclaimer, the term of this patent is extended or adjusted under 35 U.S.C. 154(b) by 296 days.

(21) Appl. No.: 13/196,740

(22) Filed: Aug. 2, 2011

(65) Prior Publication Data

US 2012/0032498 A1 Feb. 9, 2012

Related U.S. Application Data

(60) Provisional application No. 61/370,375, filed on Aug. 3, 2010.

(30) Foreign Application Priority Data

Aug. 3, 2010 (DE) .......................... 10 2010 033 268
Aug. 3, 2010 (DE) .......................... 10 2010 033 272

(51) Int. Cl.
*B60B 27/04* (2006.01)
*F16D 41/36* (2006.01)

(52) U.S. Cl.
USPC ........ 192/64; 192/110 B; 301/110.5; 384/545

(58) Field of Classification Search
USPC .................................... 192/64; 384/545, 504
See application file for complete search history.

(56) References Cited

U.S. PATENT DOCUMENTS

| | | | |
|---|---|---|---|
| 295,161 A * | 3/1884 | Garrood | 384/545 |
| 651,870 A * | 6/1900 | Little | 384/545 |
| 3,187,870 A | 6/1965 | Sabatini | |
| 3,865,220 A | 2/1975 | Thompson, Jr. | |
| 4,261,452 A | 4/1981 | Barrows | |
| 4,593,799 A | 6/1986 | Ozaki | |
| 5,515,957 A | 5/1996 | McConaghy | |
| 5,676,227 A * | 10/1997 | Hugi | 192/64 |
| 5,795,036 A | 8/1998 | Campagnolo | |
| 5,964,332 A | 10/1999 | King | |
| 6,065,580 A | 5/2000 | Kirk | |
| 6,123,179 A | 9/2000 | Chen | |
| 6,309,109 B1 * | 10/2001 | Chuang | 384/504 |
| 6,478,128 B2 | 11/2002 | Taylor | |
| 6,557,946 B1 | 5/2003 | Gerrit et al. | |
| 6,588,564 B1 | 7/2003 | Jager et al. | |

(Continued)

FOREIGN PATENT DOCUMENTS

| | | |
|---|---|---|
| CH | 558 485 | 1/1975 |
| DE | 132906 | 8/1901 |

(Continued)

*Primary Examiner* — Rodney Bonck
(74) *Attorney, Agent, or Firm* — Christie, Parker & Hale, LLP

(57) ABSTRACT

The present invention relates to a rear wheel hub for a bicycle, a rear wheel for a bicycle, and a bicycle. In order to provide a rear wheel hub which, with a further reduction in weight, still allows reliable transmission of force, the hub has a hub body (12), an axle body (14), a first bearing device (16) between the axle body and the hub body, a freewheel body (18) for accommodating at least one sprocket, a second bearing device (20) between the axle body and the freewheel body, and a freewheel arrangement (22) between the freewheel body and the hub body which in a first rotational direction (26) about the rotational axis establishes a coupling between the freewheel body and the hub body, and in a second rotational direction (28) which is opposite that of the first rotational direction, the freewheel body is freely rotatable with respect to the hub body.

10 Claims, 18 Drawing Sheets

(56) References Cited

U.S. PATENT DOCUMENTS

| | | |
|---|---|---|
| 7,562,755 B2 | 7/2009 | Spahr |
| 8,590,421 B2 * | 11/2013 | Meggiolan et al. ........... 384/545 |
| 2002/0072446 A1 | 6/2002 | Kanehisa et al. |
| 2003/0034220 A1 | 2/2003 | Chen |
| 2003/0155204 A1 | 8/2003 | Demir et al. |
| 2008/0006500 A1* | 1/2008 | Spahr .............................. 192/64 |
| 2009/0255774 A1 | 10/2009 | Hsu |
| 2010/0170762 A1* | 7/2010 | Schlanger ....................... 192/46 |

FOREIGN PATENT DOCUMENTS

| | | |
|---|---|---|
| DE | 34 08 371 A1 | 9/1984 |
| DE | 298 03 667 U1 | 6/1998 |
| DE | 198 47 673 A1 | 4/2000 |
| DE | 101 32 090 A1 | 1/2003 |
| DE | 203 06 760 U1 | 10/2004 |
| DE | 203 06 761 U1 | 10/2004 |
| DE | 10 2004 004 961 A1 | 8/2005 |
| DE | 10 2004 004 961 B4 | 3/2006 |
| DE | 10 2005 062 702 A1 | 7/2007 |
| DE | 601 21 281 T2 | 7/2007 |
| DE | 10 2007 030 190 A1 | 1/2008 |
| DE | 10 2006 040 919 A1 | 3/2008 |
| DE | 10 2007 019 611 A1 | 10/2008 |
| DE | 10 2007 019 612 A1 | 10/2008 |
| DE | 10 2008 020 257 A1 | 11/2008 |
| DE | 20 2007 016 681 U1 | 11/2008 |
| DE | 10 2007 058 587 A1 | 6/2009 |
| DE | 10 2008 013 938 A1 | 9/2009 |
| DE | 10 2008 021 803 A1 | 11/2009 |
| EP | 0 522 983 A1 | 1/1993 |
| EP | 0 998 399 B1 | 9/2002 |
| FR | 1 038 012 | 6/1951 |
| WO | WO 99/04988 | 2/1999 |
| WO | WO 00/34056 | 6/2000 |
| WO | WO 2004/096580 A1 | 11/2004 |

* cited by examiner

HUB WITH STAR RATCHET

CROSS-REFERENCE TO RELATED APPLICATIONS

This application claims the benefit of U.S. Provisional Patent Application No. 61/370,375, filed on Aug. 3, 2010, and priority to German Patent Application Number 10 2010 033 268.2, filed on Aug. 3, 2010, and German Patent Application Number 10 2010 033 272.0, filed on Aug. 3, 2010, the entire disclosure of which is hereby incorporated by reference.

FIELD OF THE INVENTION

The present invention relates to a rear wheel hub for a bicycle, a rear wheel for a bicycle, and a bicycle.

BACKGROUND OF THE INVENTION

In order to provide the user of a bicycle, in particular a mountain bike or a racing bike, with different gears for different speeds and different road and path profiles, derailleurs are used in which multiple sprockets of different sizes are provided at the rear wheel hub. These sprocket packages, also referred to as the cogsets, are connected via a freewheel to the hub, i.e., the hub body. The freewheel ensures that during a forward motion of the pedals the drive force is transmitted to the rear wheel via the chain, and that during a motion in the opposite direction, i.e., when the crank is moving backwards or is at a standstill and at the same time the bicycle is moving forward, the sprocket, i.e., the cogset, is decoupled from the hub body. In particular for expert-level mountain biking as well as professional mountain cycling, the force-transmitting components are subjected to high forces and extreme loads, while at the same time the bicycle must be as light as possible. The demands on weight are so stringent that even a reduction by a few grams is considered a success. A rear wheel hub is known from DE 10 2007 030 190 A1 in which a freewheel arrangement has two toothed disks with spur or face gearing, also referred to as star ratchet, both of which are supported in a floating manner and pressed against one another by a respective spring, the spur gearings being designed in such a way that torque acting on the sprocket via the chain is transmitted in one direction, while in the opposite rotational direction the toothed disks are moved apart from one another in the axial direction against the elastic force, thus ensuring a freewheeling state. However, it has been shown that this hub still has a fairly high weight.

SUMMARY OF THE INVENTION

There is a need to provide a rear wheel hub which, with a further reduction in weight, still allows reliable transmission of force.

According to a basic aspect of the invention, a rear wheel hub for a bicycle is provided, having a hub body, an axle body, a first bearing device, a freewheel body for accommodating at least one sprocket, a second bearing device, and a freewheel arrangement. The first bearing device is situated between the axle body and the hub body in such a way that the hub body is held in relation to the axle body so as to be rotatable about a rotational axis. The second bearing device is situated between the axle body and the freewheel body in such a way that the freewheel body is held in relation to the axle body so as to be rotatable about the rotational axis. The freewheel arrangement is situated between the freewheel body and the hub body, and in a first rotational direction about the rotational axis establishes a coupling between the freewheel body and the hub body. In a second rotational direction which is opposite that of the first rotational direction, the freewheel body is freely rotatable with respect to the hub body. The freewheel arrangement comprises a first and a second spur gearing which face one another, one being rotationally fixed with respect to the hub body, and the other being rotationally fixed with respect to the freewheel body.

According to an exemplary embodiment of the invention, the first bearing device comprises a first and a second hub bearing, each having an inner ring and an outer ring. Each hub bearing is axially held with the inner ring on one side in a first holding direction with respect to the hub axle, i.e., with respect to the axle body. Each hub bearing is also held with the outer ring in a second holding direction, opposite that of the first holding direction, with respect to the hub body, the first holding direction of the second hub bearing extending opposite to the first holding direction of the first hub bearing.

The term "inner ring" refers to the inner raceway, i.e., the inner bearing surface of the respective bearing, and "outer ring" refers to the outer raceway, i.e., the outer bearing surface of the bearing.

The term "holding on one side" refers to holding in one direction; i.e., for holding on one side a hold is provided in one direction, while a motion is possible in the other direction.

Thus, the hub bearings are each held relative to the hub axle, i.e., with the particular inner ring in the axial direction, on only side, i.e., on one side or in one direction. No hold is provided at the inner ring on the other side of the inner ring, i.e., in the other direction. The same applies to the holding with regard to the hub body, i.e., on the particular outer ring, where the hub bearings are likewise held on only side in the axial direction.

The holding direction of the inner ring of the first hub bearing is opposite the holding direction of the inner ring of the second hub bearing.

For example, additional stops, and therefore additional material, may thus be spared.

The hub bearings are held at the inner ring by a holding force which acts statically from one side, i.e., as the result of a stop or stop surface provided only on one side, and are held at the outer ring by a holding force which acts statically from the other side, i.e., as the result of a stop or stop surface provided only on the other side. None of the bearings is held at the inner ring or outer ring on two sides in either case, i.e., held in two directions; in other words, a stop is not provided on the one side of an inner ring (or outer ring) in combination with a sleeve which rests against the other side.

The holding force is a so-called zero force; i.e., in the ideal case is a stop which acts with zero tolerance and which transmits no force per se to the bearing, but instead is used only as a play-free, and also force-free, stop.

According to the above-described holding of the bearings which acts on one side but in opposite directions at the inner ring and outer ring, a parallel zero force transmission is avoided. A zero force transmission refers to the holding of two components which are movable per se without play or constraining forces. Between the two hub bearings, i.e., between the right and the left hub bearing, there is a "transmission" of a holding force, i.e., a connection of the two stops for the holding without play or constraining forces, via only one path, i.e., one component, and not via two paths at the same time. This avoids the need for exactly matching the lengths of two different components, which would be the case for a parallel zero force transmission, and which is very difficult to achieve. When the bearings are to rest against the axle (or a sleeve in between) interiorly, i.e., with the inner ring, for example, at both shoulders therebetween, and at the same time exteriorly, i.e., with the outer ring at stops of the hub body in between, the distance between the shoulders at the axle and the distance between the shoulders at the hub body must be precisely matched, which in practice results in significant problems due to the customary tolerances.

At the same time, the axial holding of the bearings on one side also means a weight advantage, since additional stops or sleeves may be dispensed with.

According to another exemplary embodiment of the invention, the second bearing device comprises a first and a second freewheel bearing, each having an inner ring and an outer ring. Each freewheel bearing is axially held with the inner ring on one side in a first holding direction with respect to the hub axle, i.e., with respect to the axle body. Each freewheel bearing is also held with the outer ring on one side in a second holding direction, opposite that of the first holding direction, with respect to the freewheel body, the first holding direction of the second freewheel bearing extending opposite to the holding direction of the first freewheel bearing.

In other words, the first and the second freewheel bearings are held in mutually opposite directions with respect to the hub axle, i.e., with the particular inner ring, and the first and the second freewheel bearings are likewise held in mutually opposite directions with respect to the freewheel body i.e., with the particular outer ring.

According to another aspect of the invention, the bearings, i.e., the hub bearings and the freewheel bearings, are each held in one axial direction at an inner region which faces the hub axle, and are held in the other axial direction at the outer region which faces the hub body or freewheel body.

According to another aspect of the invention, the hub body comprises an inner first and second shoulder as axial stops for the first and the second hub bearings. The freewheel body has a first and a second shoulder as axial stops for the first and the second freewheel bearings.

According to another aspect of the invention, the hub body has a first and a second bearing holder for the first and second hub bearings, each bearing holder being designed for accommodating the hub bearing. The first and second bearing holders are each designed as axially extending cylindrical cavities which are open on the one end face over the entire cross-sectional area for insertion of the bearing, and on the other side are delimited by a shoulder as an axial stop for the bearing thereof.

According to another aspect of the invention, the freewheel body for the first and the second freewheel bearings comprises a first and a second bearing holder, each being designed for accommodating the freewheel bearing. The first and second bearing holders are each designed as axially extending cylindrical cavities which are open on the one end face over the entire cross-sectional area for insertion of the bearing, and on the other side are delimited by a shoulder as an axial stop for the bearing.

According to another exemplary embodiment, a first end cap and a second end cap are provided which are placed on both ends of the hub axle, and which at their inner side rest against the respective end-face end of the hub axle such that, in the mounted state, a clamping force axially acting on the rear wheel hub is transmissible from the end caps via the axle body.

The clamping force may be produced by a quick-release mechanism, for example, by means of which the rear wheel hub, and therefore a rear wheel, is held or mounted between two dropouts; instead of a quick-release mechanism, a full-floating axle system (known as through-axle), for example, may be used to produce or apply the clamping force between the dropouts (also see below).

According to another aspect of the invention, the first end cap is provided as an axial stop for one of the two hub bearings. Any deviations in the dimensions in the region of the end cap may thus be accommodated, for example using a compensating element between the end cap and the end face of the axle body (if a positive tolerance is present, i.e., if one or more dimensions are too large), or using a compensating element between the end cap and the hub bearing, i.e., the inner ring of the hub bearing (if a negative tolerance is present, i.e., if one or more dimensions are too small).

According to one aspect of the invention, it is provided that at least the holding of the hub bearings occurs in such a way that in the sequence of the individual components, the sum of the inaccuracies may be compensated for using a compensating element in the region of the end cap(s).

According to another aspect of the invention, the first end cap is provided as an axial stop for one of the two hub bearings, and the second end cap is provided as an axial stop for one of the two freewheel bearings. A sleeve is provided between the first freewheel bearing and the second hub bearing as an axial stop for the second freewheel bearing and the second hub bearing. For example, a sleeve is provided between the other of the two freewheel bearings and the other of the two hub bearings as a third axial stop for the other of the two freewheel bearings, and as a fourth axial stop for the other of the two hub bearings.

According to one aspect of the invention, it is provided that the holding of the hub bearings the holding of the freewheel bearings occurs in such a way that in the complete sequence of the individual components, the sum of the added inaccuracies may be compensated for using a compensating element in the region of the end cap(s). The compensating element compensates for the difference in length, so that the end caps transmit the clamping force directly, or also indirectly via a compensating element, to the axle body, and there is no transmission of the clamping force to one or more hub/freewheel bearings. Transmission of the clamping force via the bearings, for example via an inner raceway, does not occur.

According to one aspect of the invention, it is provided that hub bearings and freewheel bearings may be pushed onto the axle body, together with the hub body and the freewheel body, for assembly of the rear wheel hub. One of the end caps is pushed onto the axle body until reaching the stop at the end face. When all components are installed, when the second end cap is mounted it may be determined whether there is an overall deviation in the length: if the second end cap is likewise pushed on until reaching the stop, and the hub body or freewheel body is able to turn only with difficulty, at least one of the bearings is under constraint, i.e., an applied force which attempts to displace one raceway with respect to the other raceway in the axial direction. If the hub body or freewheel body is able to move with axial play, i.e., with wobbling, at least one of the bearings is not held on both sides.

However, since the bearings at the inner ring and the outer ring are always held only on one side, the compensation may be made at any desired location, since the compensation is transmitted over the entire chain. As mentioned above, for this purpose it is provided that the holding force, i.e., the connection of two stops (see above), is always transmitted only on one path between two adjacent parts, i.e., the bearings in particular, and no parallel zero force transmission or parallel holding force transmission is present, but, rather, only a one-way holding force transmission, in a manner of speaking. The tolerance compensation is advantageously carried out at an easily accessible location with regard to the end caps, whereby the determined tolerance compensation may be performed by an element at one side or end, or also by two elements distributed on both ends. When both positive and negative tolerances result in the sequence, the holding force transmission, which is always one-way, also allows compensation within the sequence, so that, for example, if in the end result the positive and negative deviations are equal, no overall deviation is determined, and additional compensation is not necessary.

The direct application of the clamping force by the end caps to the axle body, which is also understood to mean the application via a compensating element between the end cap and the axle body, is carried out independently of the play-free mounting of the bearings due to the fact that the inner sides of the end caps rest against the an axle body; i.e., the end faces of the axle body act as a stop for the end caps.

The determination of correct play-free mounting of the bearings, i.e., the hub bearings and also the freewheel bearings, is then based on the distance between the end caps, which are provided at a fixed interval on the axle body.

It is pointed out that, according to the invention, a stop may also be provided on the axle against which the hub bearing sequence rests on one side, for example on the side facing the freewheel body. The stop at the same time may be used for the sequence of the freewheel bearings. Tolerance compensation would then be provided, at least for the hub bearing sequence, in the region of the end cap situated on the side opposite from the freewheel body. For the freewheel bearing sequence, tolerance compensation may then be provided in the region of the other end cap. It is only important that between two adjacent bearings, only one path is provided for transmission of the holding force.

According to another aspect of the invention, the end caps are mounted on the axle body in a manner which prevents them from coming off or slipping. This allows a rear wheel to be removed without the risk of the individual components slipping off the axle. For example, the end caps are designed with a clear inside diameter such that they are pushed onto the axle body against a resistance. The end caps may be detached by striking, for example, so that they may be pushed from the axle, for example, by light strokes from a hammer.

According to another aspect of the invention, the end caps are replaceable and are designed for use with a quick-release clamping device.

According to another aspect of the invention, the end caps are replaceable and are designed for use with a full-floating axle system (also known as through axle), the end caps having an end-face stop for contacting against the inner sides of the dropouts. The end caps have a clear opening through which a full-floating axle may be guided, which has a stop at one end for contacting against the outer side of the one dropout, and an external thread for screwing into an internal thread on the other dropout.

According to an exemplary embodiment of the invention, the first bearing device has a first and a second hub bearing. The first and the second hub bearings each have two bearing units. The hub body for the first and the second hub bearings has a first and a second bearing holder, each being designed for accommodating the two bearing units, wherein for each hub bearing one of the two bearing units is replaceable with a spacer unit.

The design with two bearing units means a weight savings, since for the same load capacity the two bearings together have a lower overall weight. The option of exchanging one of the bearing units with a spacing ring results in a further option for weight reduction, although at a lower load capacity (see below).

Each bearing unit situated facing the hub center is preferably replaceable.

According to another aspect of the invention, the two bearing units have the same design.

According to an exemplary embodiment of the invention, the second spur gearing is provided on a second disk body which is screwed into a receiving opening in the hub body, the direction of screwing in corresponding to the coupling direction.

The rotationally fixed connection is established at the moment that the disk body is completely screwed in, i.e., up to a stop.

To allow the disk body to be removed for replacement, for example, the disk body may have attachment points for applying a tool in order to unscrew the disk body from the receptacle.

The screwing-in ensures a reliable transmission of force. At the same time, the disk body may be extremely thin, i.e., have a light design, since the force is transmitted with no play.

According to another aspect, the hub bearing which is oriented facing the freewheel mechanism is inserted into the hub body.

This allows the hub bearing to be situated as far as possible to the end of the axle, resulting in improved leverage, which in turn results in lower bending load on the axle body.

According to another aspect of the invention, the second disk body may alternatively be permanently connected to the hub body, for example by pressing into a receiving opening or by welding or adhesive bonding to the hub body. For example, pressing and welding or adhesive bonding may also be used in combination.

According to another aspect of the invention, the second spur gearing is provided directly at the hub body.

According to another embodiment, the first spur gearing is provided on a first disk body which is held with respect to the rotational axis in a floating manner, and is pushed in the direction of the second spur gearing by a pretensioning or biasing device. The pretensioning device has an elastically resetting device which is supported on the freewheel body and which pushes the first disk body in the direction of the second spur gearing. The elastically resetting device is designed in such a way that the first disk body is evenly pushed in the direction of the second spur gearing, and a biasing force against tilting of the first disk body may be generated.

For example, the pretensioning device has an elastic annular body which is situated between the freewheel body and the first disk body, and against which the first disk body rests.

The elastic ring may be situated in the receptacle in the freewheel body, between a stop and the first disk body.

As a result of the pretensioning device, for example the elastic annular body, the disk body and therefore the first spur gearing is evenly pushed against the second spur gearing. The pretensioning device counteracts tilting of the disk body. In contrast to conventional spiral springs which are provided around the axle, the pretensioning device according to the invention pushes on the entire disk body, while for the same biasing force the mentioned spiral springs are weaker with regard to tilting. The disk body according to the invention may thus be produced with a narrower, i.e., lighter, design. As a result, there is also more room for the hub bearing in this region; the farther outward the hub bearings are located, the better the transmission of force from the wheel to the frame structure (not shown).

According to another aspect of the invention, only the first disk body is held in the axial direction in a floating manner, and the second disk body is held so as to be immovable in the direction of the pretensioning device. For example, the second disk body rests fixedly against the hub body; for example, the second disk body is fastened, for example detachably fastened, to the hub body in the axial direction.

According to another aspect of the invention, the pretensioning device has at least three springs which are supported on the freewheel body and which push the first disk body in the direction of the second spur gearing.

According to another aspect of the invention, the springs are held captive against the first disk body.

According to another aspect of the invention, the springs are designed as conical springs.

According to another aspect of the invention, the springs are supported on a projection of the freewheel body provided inside the receptacle in the hub body. For example, the projection is formed by an inserted disk ring.

According to an exemplary embodiment of the invention, the first bearing device has a first and a second hub bearing, each of which is situated at one of the two end-face regions of the hub body. The hub bearing which is oriented facing the freewheel body has an inner raceway and an outer raceway, and the second spur gearing is designed in one piece with the outer raceway.

According to another aspect of the invention, the inner raceway lies against the hub axle, and the outer raceway is connected to the hub body in a rotationally fixed manner.

According to another aspect of the invention, the second spur gearing is immovably held, at least in the pretensioning direction.

As a result of only one of the two spur gearings being supported in a floating manner, a freewheel mechanism may be provided which has a further reduction in space requirements as well as in weight. In addition, reliable transmission of force is ensured; in other words, the components may be additionally reduced for the same transmission of force.

According to another aspect, the hub axle is designed as a hollow axle having a continuous cavity.

According to another aspect of the invention, the hub axle has a continuous cylindrical lateral surface. For example, the hub axle has a constant wall thickness over the entire length.

According to another aspect, the freewheel body is designed for accommodating a cogset having multiple sprockets. As mentioned above, the sprockets or gear wheels are also referred to as pinions, and a cogset is also referred to as a sprocket package or as a cassette sprocket.

According to another aspect, the spur gearings have a sawtooth profile which is composed of alternating flat, angled tooth flanks and steeply inclined tooth flanks extending essentially parallel to the hub axle. When the freewheel body undergoes a rotational motion in relation to the hub body in the coupling direction, the steeply inclined tooth flanks of the two spur gearings lie against one another, and a result of this coupling ensure good transmission of force. The steep tooth flanks preferably each extend in a plane parallel to the hub axle. When the freewheel body undergoes a rotational motion in relation to the hub body in the other direction, the angled tooth flanks slide against one another, thus moving the spur gearings so far apart in the axial direction that the two spur gearings are able to rotate past one another.

According to another aspect of the invention, the steep tooth flanks of the spur gearings are provided with an undercut, so that the two gearings draw toward one another when force is transmitted. This ensures that reliable transmission of force is possible, even for locking over one-half the depth, since the two gearings are drawn toward one another due to the application of force in order to ensure complete engaging.

According to another exemplary embodiment of the invention, the second spur gearing is provided on a second disk body which is immovably held at the hub body.

According to another aspect of the invention, the second disk body may be inserted into a receiving opening in the hub body, and has at least one projection which engages with a recess in the hub body in such a way that the second disk body is connected to the hub body in a rotationally fixed manner.

The projection which engages with the recess, which, for example, may be gearing which is uniformly provided in the circumferential direction, ensures reliable transmission of force.

According to another exemplary embodiment, the first disk body is inserted into a receiving opening in the freewheel body which extends in the axial direction, the first disk body engaging with projections in axially extending recesses in the freewheel body in such a way that the first disk body is connected to the freewheel body in a rotationally fixed manner.

According to another aspect of the invention, the first disk body has a plurality of radial projections, and the recesses in the freewheel body are designed as a groove structure which matches the radial projections.

According to another aspect of the invention, the receiving opening in the freewheel body is wider in the axial direction than the axial width of the first disk body.

According to another aspect of the invention, the first disk body has a width in the axial direction which is greater than a width of the second disk body.

According to another aspect of the invention, the receiving opening in the freewheel body has a width in the axial direction which is greater than the receiving opening in the hub body.

According to another aspect of the invention, the first and the second bearing holders in the hub body are each designed as an axially extending cylindrical cavity which is open at the one end face over the entire cross section for insertion of the bearings, and on the other side is delimited by a shoulder as the axial stop for the bearings. The second bearing holder is situated in the second end-face region of the hub body. The receiving opening in the hub body for accommodating the second disk body merges into the second bearing holder, the second hub bearing being insertable through the receiving opening and into the bearing holder.

According to another aspect of the invention, the outer diameter of the second hub bearing is smaller than the minimum outer diameter of the second disk body; i.e., the outer diameter of the second hub bearing is smaller than the inside diameter of the receiving opening in the hub body.

According to the invention, a wheel for a bicycle is also provided, having a rim, a hub, and a spoke body, the spoke body connecting the rim to the hub. The hub is designed as a rear wheel hub according to one of the preceding exemplary embodiments.

The term "spoke body" refers to the design of multiple partially crossing spokes, which may be subjected only to a tensile load. However, the term "spoke body" also refers to embodiments in which only a few, for example three or five, connections are provided between the rim and the hub, which may also be subjected to a pressure load. The term "rim" refers to the circumferential region on which the casing or inner tube is mounted.

The invention also comprises a bicycle having a frame, a front wheel, and a rear wheel, the rear wheel being designed as a wheel according to the preceding exemplary embodiment.

Of course, the individual features and aspects may be combined with one another, which sometimes also may result in advantageous effects which go beyond the sum of the individual effects.

It is further pointed out that in particular the embodiments described in the claims, especially those in the independent claims, may also be singly or also multiply combined with one another.

According to the present invention, for example, the one-sided axial holding of the hub bearings, and also of the freewheel bearings, for example, together with two bearing units per hub bearing is provided, in which a bearing may be replaced with a spacing ring to ensure maximum weight reduction for the bearing design. The holding on one side assists in replacing a bearing with spacing ring, since the individual parts are assembled by pushing onto the axle. The corresponding play-free, positive-fit seating results, for example, from mounting of the end caps, possibly together with compensating elements.

According to the present invention it is provided, for example, that the spur gearing on the screwed-in disk body is combined with uniform pushing of the first disk body in order to provide the flattest possible structure so that, for example, the hub bearings may be positioned as far to the outside as possible.

According to the present invention it may also be provided, for example, that the spur gearing on the screwed-in disk body having the one-piece design of the outer raceway of the hub bearing is provided with the second spur gearing in order to further minimize the structure in the axial direction. This may also be achieved in combination with the uniform pushing of the first disk body.

By reducing the axial thickness of the structure of the spur gearing, for example space is advantageously provided which may be used for providing two bearing units, or a bearing unit and a spacing ring.

To achieve the lowest possible weight, it is provided to combine the one-sided axial holding of the hub bearings with the spacer unit, with the screwed-in spur gearing, with the elastic body, which acts uniformly on the disk body which is to be provided with a thinner design, and with the one-piece design of the outer raceway of the hub bearing, with the second spur gearing. This combination provides a rear wheel hub which is particularly suited for professional and semi-professional racing due to the reduced weight and the reliable transmission of force which is still present. These and other aspects of the present invention are explained and illustrated with reference to the embodiments described below.

BRIEF DESCRIPTION OF THE DRAWINGS

For further clarification and better understanding, the invention is explained in greater detail below based on exemplary embodiments with reference to the accompanying drawings, which show the following.

DETAILED DESCRIPTION OF EXEMPLARY EMBODIMENTS

Figure 1:
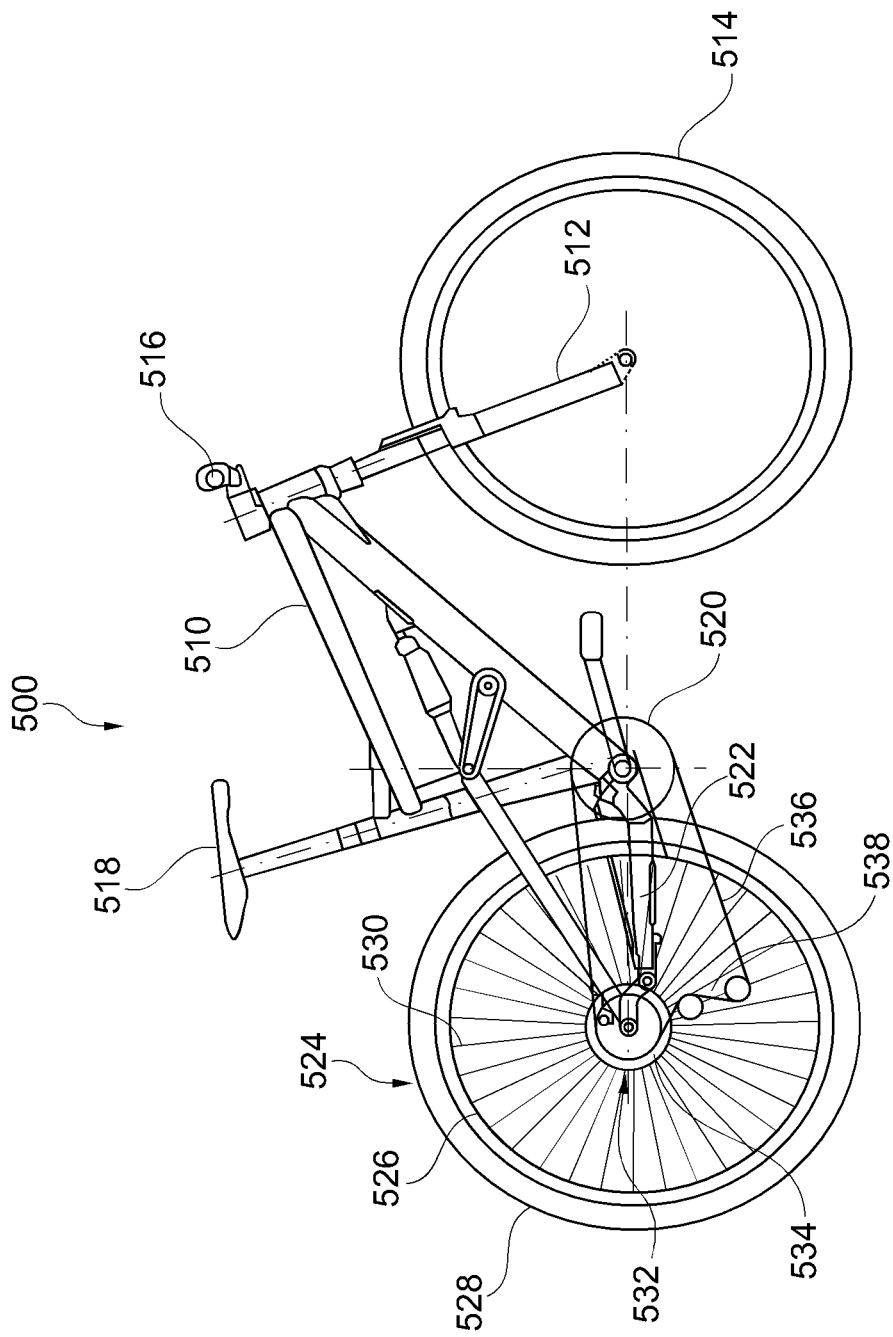
FIG. 1 shows a bicycle according to an exemplary embodiment of the invention, in a side view.

FIG. 1 shows a bicycle 500 comprising a frame 510 composed of various tubes, and a fork 512 for accommodating a front wheel 514. The bicycle also has a handlebar 516 and a seat 518; typically used mounting devices such as the seat tube and steering tube as well as shifting and braking devices are not described in greater detail. A bottom bracket bearing 520 is also indicated. A receptacle for a rear wheel 524 is provided at a rear dropout 522 according to the invention. The rear wheel 524 according to the invention has a rim 526, on which a tire in the form of a casing 528 is mounted. The rim 526 is connected to a rear wheel hub 532 according to the invention by means of a spoke body 530. The rear wheel hub comprises a cogset 534 which is connected to the bottom bracket bearing via a chain 536 and which is driven by the pedaling motion. The cogset 534 has multiple sprockets, wherein the chain 536 may be positioned on different sprockets by means of a rear derailleur 538. The hub 532 according to the invention comprises a freewheel mechanism and bearing devices, which are explained in greater detail with reference to the following description of the figures.

Figure 2:
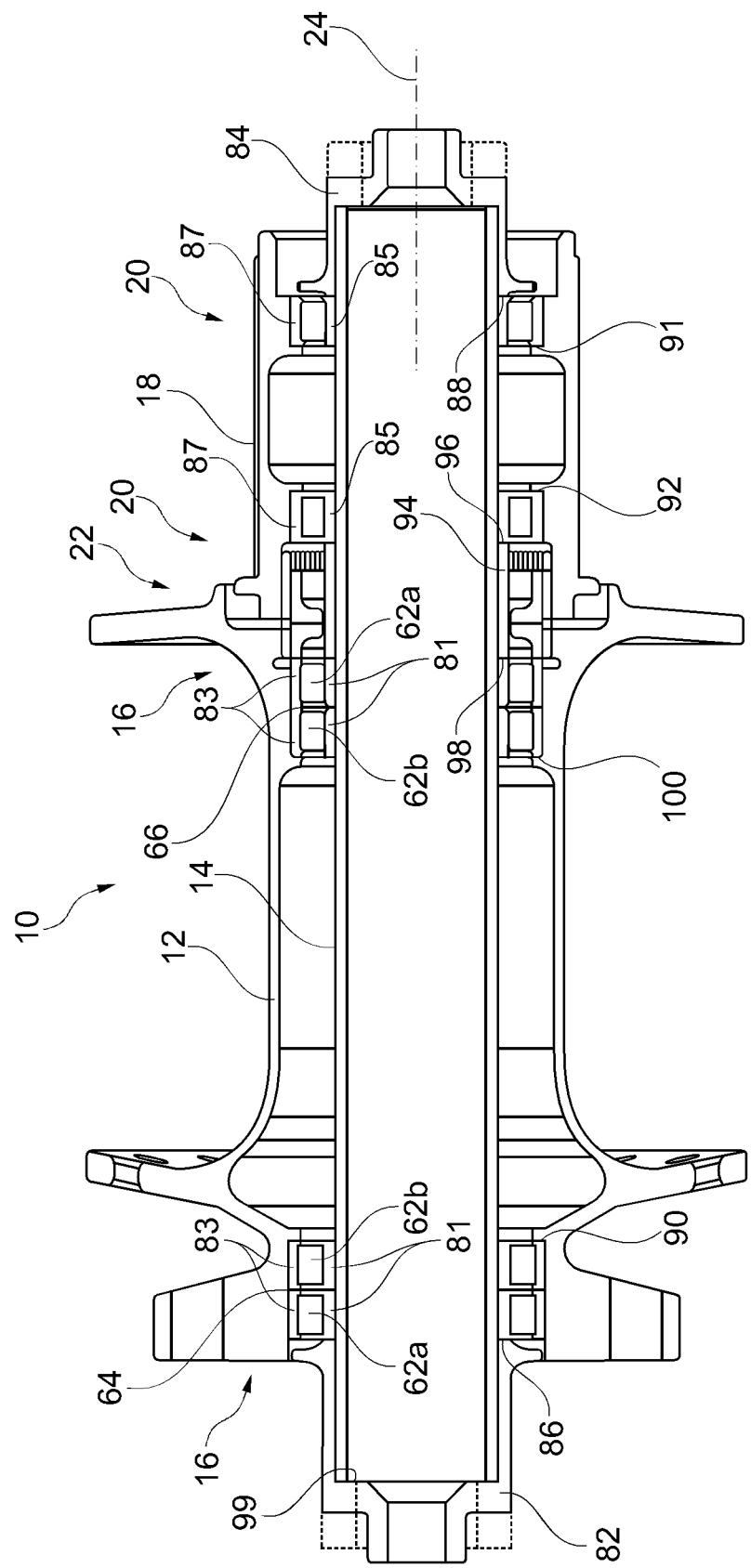
FIG. 2 shows a schematic longitudinal section of a rear wheel hub according to the invention, along the rotational axis.

FIG. 2 shows a sectional illustration of a hub 10 according to the invention which corresponds to the hub 532 from FIG. 1. The rear wheel hub 10 has a hub body 12, an axle body 14, a first bearing device 16, a freewheel body 18 for accommodating at least one sprocket, for example the cogset 534 from FIG. 1, a second bearing device 20, and a freewheel arrangement 22.

The first bearing device 16 is situated between the axle body 14 and the hub body 12 in such a way that the hub body is held in relation to the axle body so as to be rotatable about a rotational axis 24. Thus, the hub body 12 is rotatably supported on the axle body 14 by means of the first bearing device 16.

The freewheel arrangement 22 is situated between the freewheel body 18 and the hub body 12, and in a first rotational direction 26 (indicated by a first arrow P1 in FIG. 4) about the rotational axis 24 establishes a coupling between the freewheel body 18 and the hub body 12. In addition, the freewheel body 18 is freely rotatable with respect to the hub body 12 in a second rotational direction 28 (illustrated by a second arrow P2 in FIG. 4).

With the aid of a cogset, for example the cogset 534 from FIG. 1, by means of a forward pedaling motion it is thus possible to apply a force to the wheel and drive the bicycle. In the opposite direction, i.e., for a backward pedaling motion, the sprocket is able to move freely relative to the wheel. It is thus also possible for the bicycle to move forward without a rotational motion of the wheel being transmitted via the sprocket, and thus also to the chain and to the bottom bracket bearing, which would cause motion of the cranks and the pedals mounted thereon.

Figure 3:
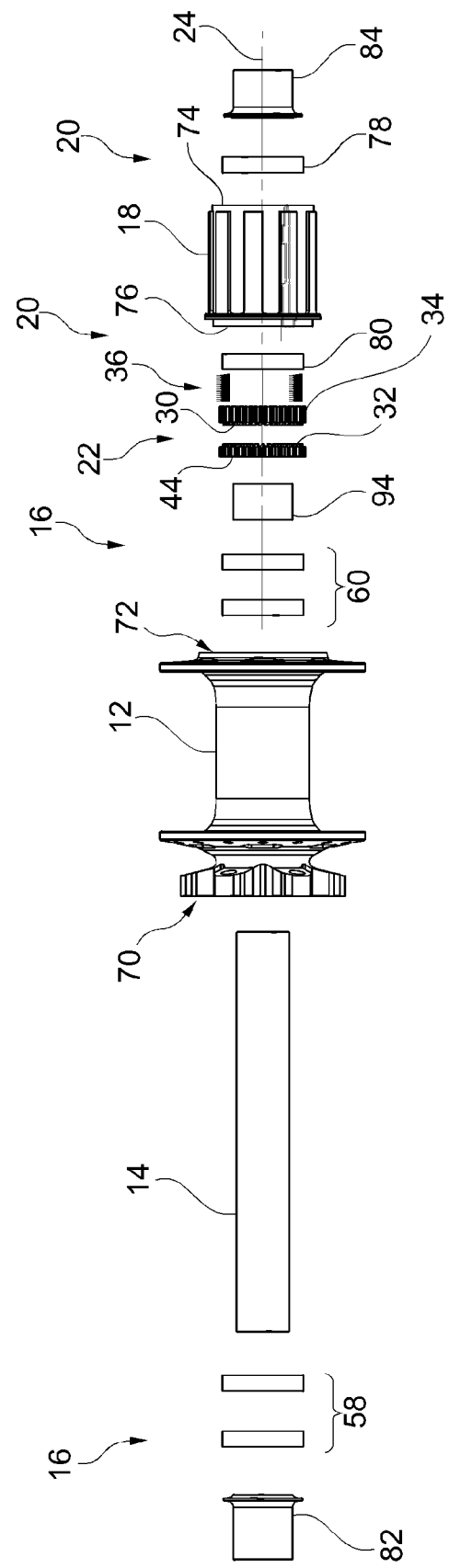
FIG. 3 shows an exploded illustration of the rear wheel hub according to FIG. 2, in a top view.

For better understanding, FIG. 3 shows the rear wheel hub 10 from FIG. 2 in an exploded drawing in a top view in which the individual components are more clearly identifiable. Some of the components will be further discussed, using the reference numerals already indicated in FIG. 3.

Figure 4:
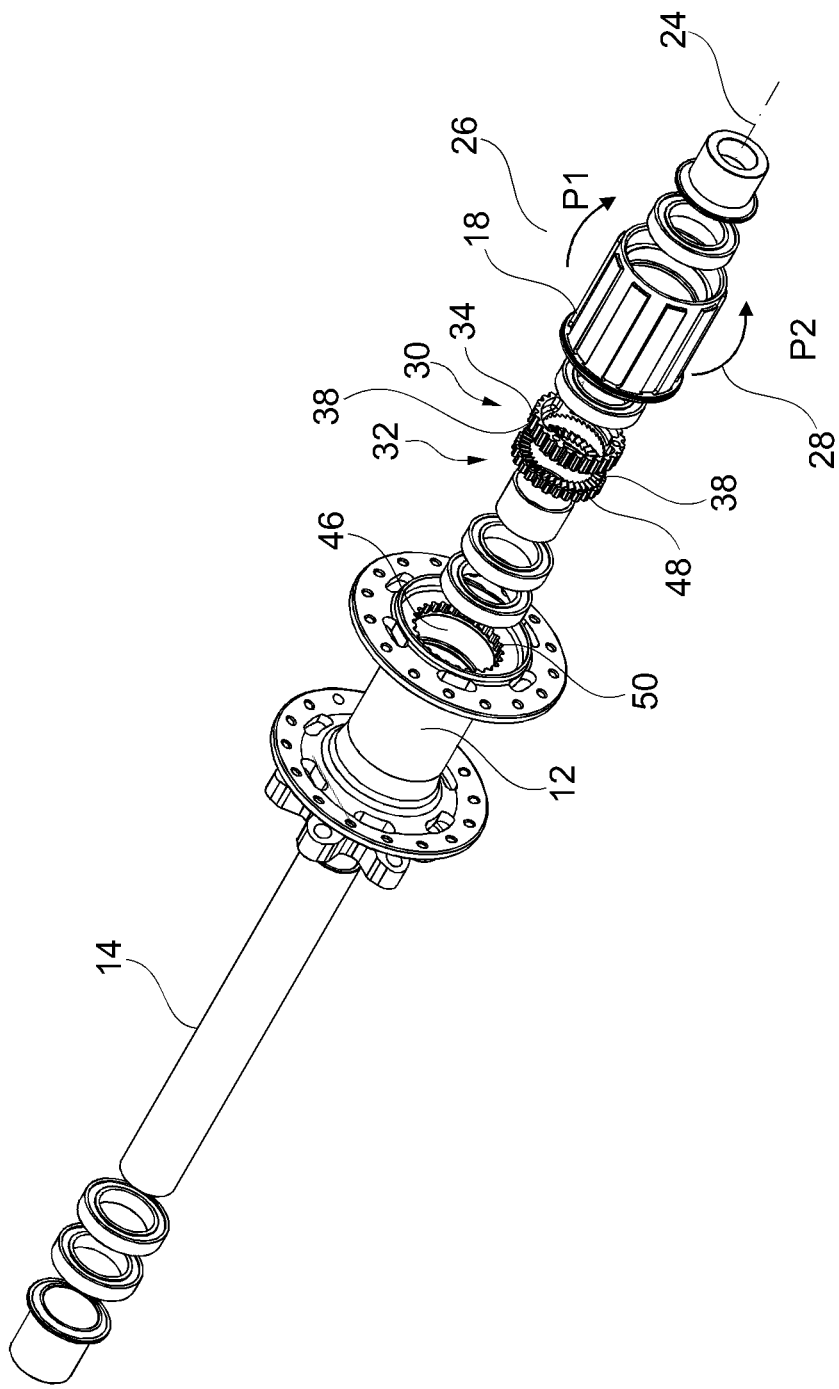
FIG. 4 shows a perspective illustration of the exploded illustration according to FIG. 3.

FIG. 4 shows an exploded illustration in a perspective view.

The freewheel arrangement 22 has a first spur gearing 30 and a second spur gearing 32 which face one another, one being rotationally fixed with respect to the hub body 12 and the other being rotationally fixed with respect to the freewheel body 18.

According to one aspect of the invention, the first spur gearing 30 is provided on a first disk body 34 which is held with respect to the rotational axis 24 in a floating manner and is pushed in the direction of the second spur gearing 32 by a pretensioning device 36.

According to another aspect, in the installed state, i.e., in the completely mounted rear wheel hub 10, the second spur gearing 32 is immovably held, at least in the pretensioning direction. Thus, in contrast to the first spur gearing 30, the second spur gearing 32, with respect to the rotational axis, is not held in a floating manner.

According to a design variant not shown, the second spur gearing is also provided on a disk body and is held with respect to the rotational axis in a floating manner, and is pushed in the direction of the first spur gearing by a further pretensioning device which has an elastic annular body, for example (not shown).

Figure 7:
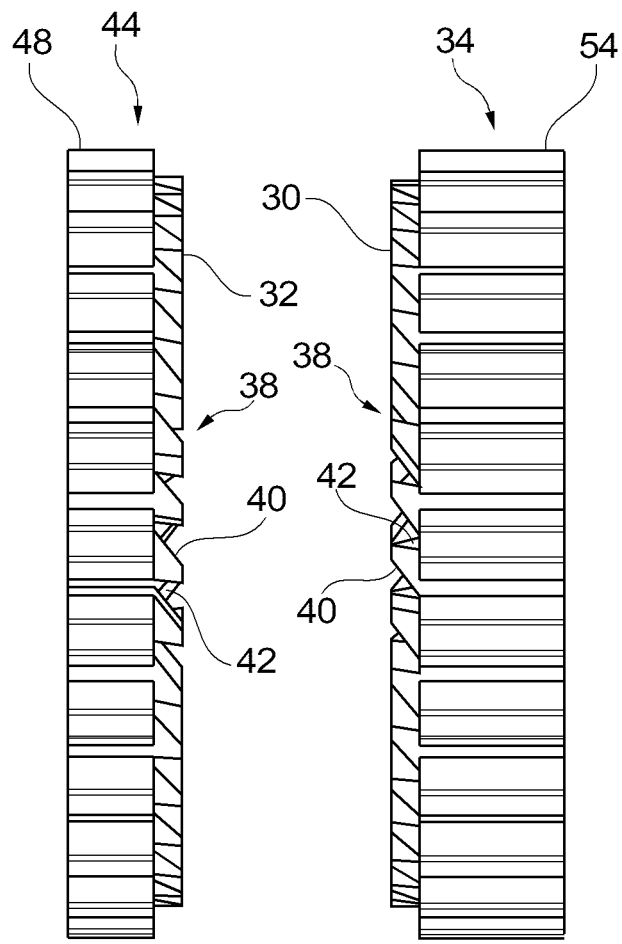
FIG. 7 shows a first embodiment of a freewheel arrangement having a spur or face gearing.

The spur gearings 30, 32 have a sawtooth profile 38 composed of alternating flat, angled first tooth flanks 40 and steeply inclined second tooth flanks 42 extending parallel to the hub axle 24, as is more easily identifiable in FIG. 7. When the freewheel body 18 undergoes a rotational motion in relation to the hub body 12 in the coupling direction, i.e., the first rotational direction 26, the steeply inclined second tooth flanks 42 of the two spur gearings 30, 32 rest against one another, and as a result of this coupling ensure reliable transmission of force, even for high torques.

When the freewheel body 18 undergoes a rotational motion in relation to the hub body 12 in the other direction, i.e., in the second rotational direction 28, the angled first tooth flanks 40 slide against one another and move the spur gearings 30, 32 so far apart in the axial direction, i.e., in the direction parallel to the rotational axis 24, that the two spur gearings 30, 32 are able to rotate past one another since the tooth flanks are no longer engaged with one another.

Since according to an exemplary embodiment the second spur gearing is immovably held in the pretensioning direction, an axial offset, i.e., an axial displacement, is carried out only by the first spur gearing 30 on the first disk body 34. The pretensioning direction extends parallel to the rotational axis 24, and in FIG. 4 is directed upwardly to the left. In other words, in a horizontal view of FIG. 4 the pretensioning device 36, which is not illustrated in FIG. 4, pushes the first disk body 34 obliquely upward to the left, parallel to the rotational axis 24, against the second spur gearing 32, which is held with respect to the rotational axis 24 by an abutment.

According to an exemplary embodiment of the invention shown in FIG. 4, the second spur gearing 32 is provided on a second disk body 44 which is immovably held on the hub body in the direction of the pretensioning device.

For example, the second disk body 44 is inserted into a receiving opening 46 in the hub body 12, and has at least one projection which engages with a recess in the hub body in such a way that the second disk body 44 is connected to the hub body in a rotationally fixed manner.

According to an exemplary embodiment, the at least one projection is designed as a plurality of uniformly distributed radial projections in the form of a radial tooth structure 48, and the recess in the hub body is designed as a groove-structure 50 which matches the radial tooth structure projections 48.

According to an embodiment, the projections are uniformly designed; however, it may also be provided that the radial projections have a nonuniform design and engage with a matching nonuniform grooved structure, so that the second disk body must always assume the same rotational angle position with respect to the hub.

Figure 14:
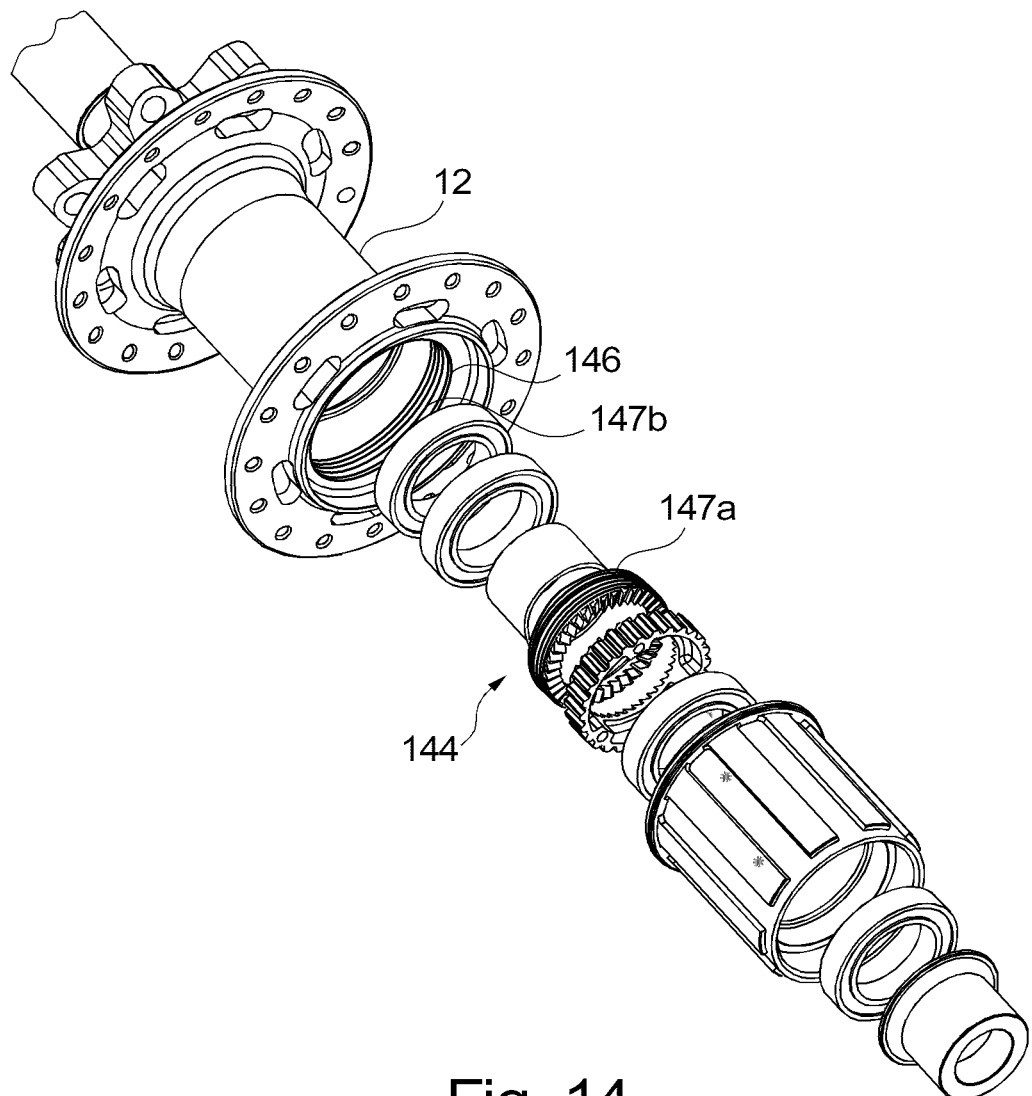
FIG. 14 shows another embodiment of a freewheel arrangement in a perspective exploded illustration according to the invention.

According to another embodiment illustrated in FIG. 14, the second disk body, denoted by reference numeral 144, is screwed into a receiving opening 146 in the hub body 12, the direction of screwing in corresponding to the coupling direction. For this purpose, the second disk body 144 has, at least in places, a radial external thread 147a on the radial circumferential surface, and the receiving opening 146 has a matching internal thread 147b on the inner radial wall surface. When a force is applied to the sprocket and a coupling via the freewheel arrangement 22, i.e., the spur gearings, the second disk body 48 is screwed into the receiving opening 146 in such a way that when it is completely screwed in, i.e., when it rests against a shoulder provided for this purpose, further rotation is prevented and force may be reliably transmitted.

The second disk body 34 has at least two attachment points for applying a tool to allow the second disk body to be unscrewed (not shown in FIG. 14) from the receiving opening 146.

Figure 15:
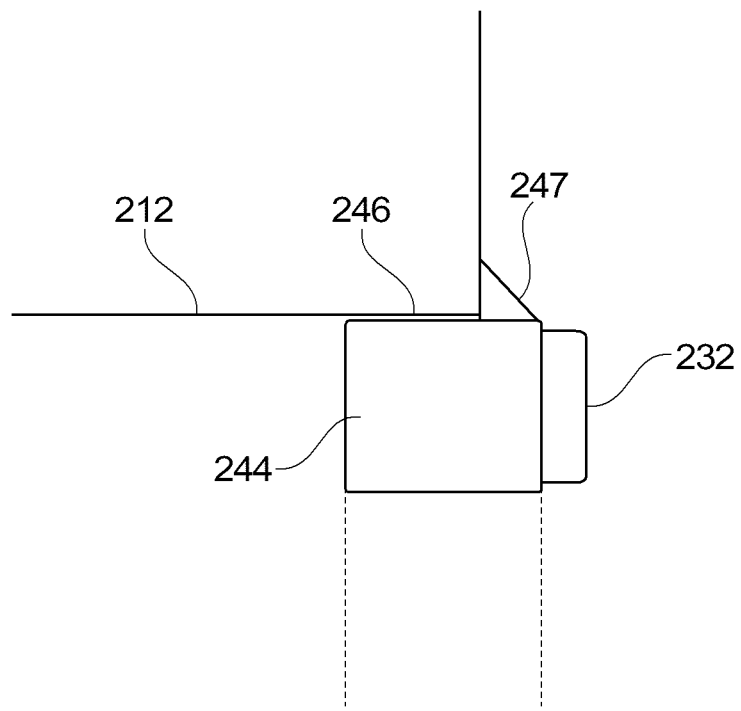
FIG. 15 shows a detail of another embodiment of a freewheel arrangement according to the invention.

According to another embodiment illustrated in cross section in FIG. 15, a second spur gearing 232 is situated on a second disk body 244 which is permanently connected to the hub body 212, for example by pressing into a receiving opening 246 and welding or adhesively bonding to the hub body 212, as indicated by a weld seam symbol 247 in FIG. 15. The pressing may also be carried out without welding or adhesive bonding. Likewise, the disk body 244 may be only welded or adhesively bonded to the hub body.

Figure 16:
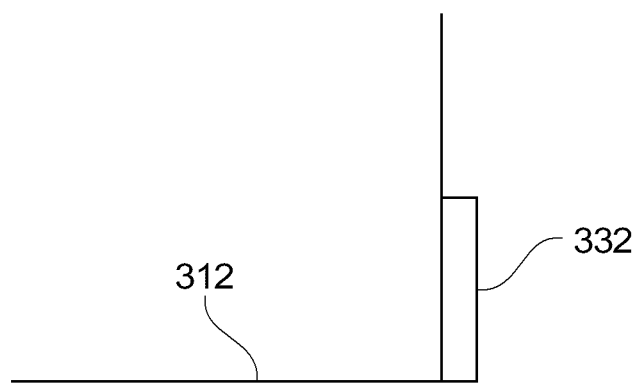
FIG. 16 shows a detail of another embodiment of a freewheel arrangement according to the invention.

According to another embodiment indicated in FIG. 16, a second spur gearing, denoted by reference numeral 332 in FIG. 16, is provided directly at the hub body 312, for example by milling from one piece or production in some other way.

Figure 5:
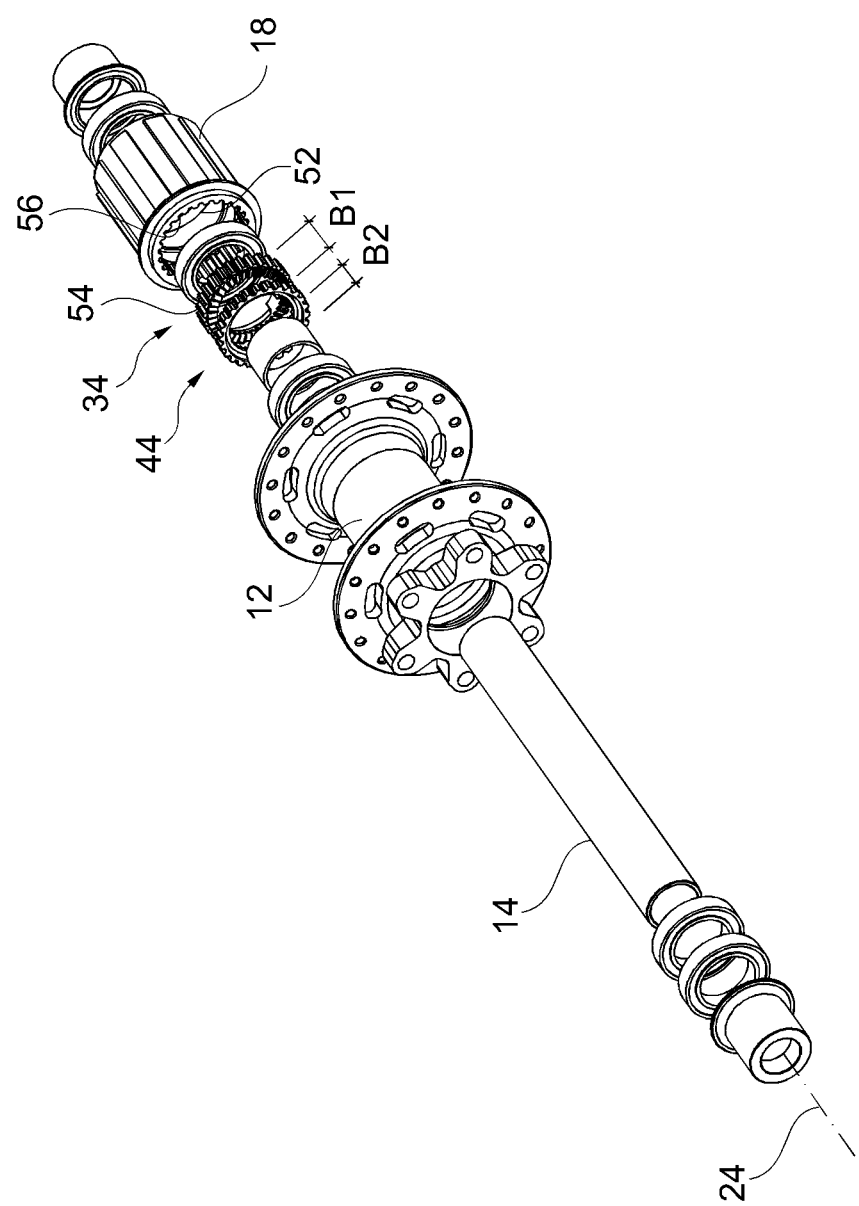
FIG. 5 shows another exploded illustration from a different viewing direction.

According to another aspect of the invention, the first disk body 34 is inserted into a receiving opening 52, extending in the axial direction, in the freewheel body 18, as illustrated in FIG. 5 in an exploded drawing shown from a different viewing angle. The first disk body 34 engages with projections 54 in axial extending recesses 56 in the freewheel body 18 in such a way that the first disk body 34 is connected to the freewheel body 18 in a rotationally fixed manner. The projections 54 are designed as uniformly distributed radial gear teeth, and the recesses 56 in the freewheel body 18 are designed as a grooved structure which matches the radial projections. The projections 54 and the recesses 56 may also have a nonuniform design, for example to ensure a given rotational angle position of the first disk body with respect to the freewheel body 18.

To ensure axial play of motion of the first disk body 34, i.e., to guarantee the floating support with respect to the rotational axis 24, the receiving opening 52 in the freewheel body 18 is wider in the axial direction, i.e., in the direction parallel to the rotational axis 24, than an axial width B1 of the first disk body 34.

As is apparent from FIG. 5, the first disk body 34 may have an axial width B1 in the axial direction which is greater than an axial width B2 of the second disk body 44. This results from the fact that, in the exemplary embodiment shown, the second disk body 44 is not held in a floating manner, and the radially situated exterior toothed structure only has to ensure transmission of force in a fixed position, while the floatingly supported first spur gearing 30 also always means a certain tilting of the first disk body 34. Because the second disk body 44 does not have a floating design, but instead is immovably held in the pretensioning direction, the second disk body 44 is not able to tilt; the second disk body 44 may therefore be designed with a reduced width, which at the same time means a reduction in weight. The receiving opening 52 in the freewheel body therefore has a greater width in the axial direction than the receiving opening in the hub body (the latter is not visible in FIG. 5).

According to another aspect of the invention, the first bearing device 16 has a first hub bearing 58 and a second hub bearing 60; the two hub bearings are described in greater detail below.

According to another aspect of the invention, the first hub bearing 58 and the second hub bearing 60 each have two bearing units 62a, 62b, and the hub body 12 has a first bearing holder 64 and a second bearing holder 66 for the first and the second hub bearings 58, 60, each bearing holder designed for accommodating the two bearing units 62a, 62b. The two bearing units 62a, 62b preferably have the same design.

Figure 17:
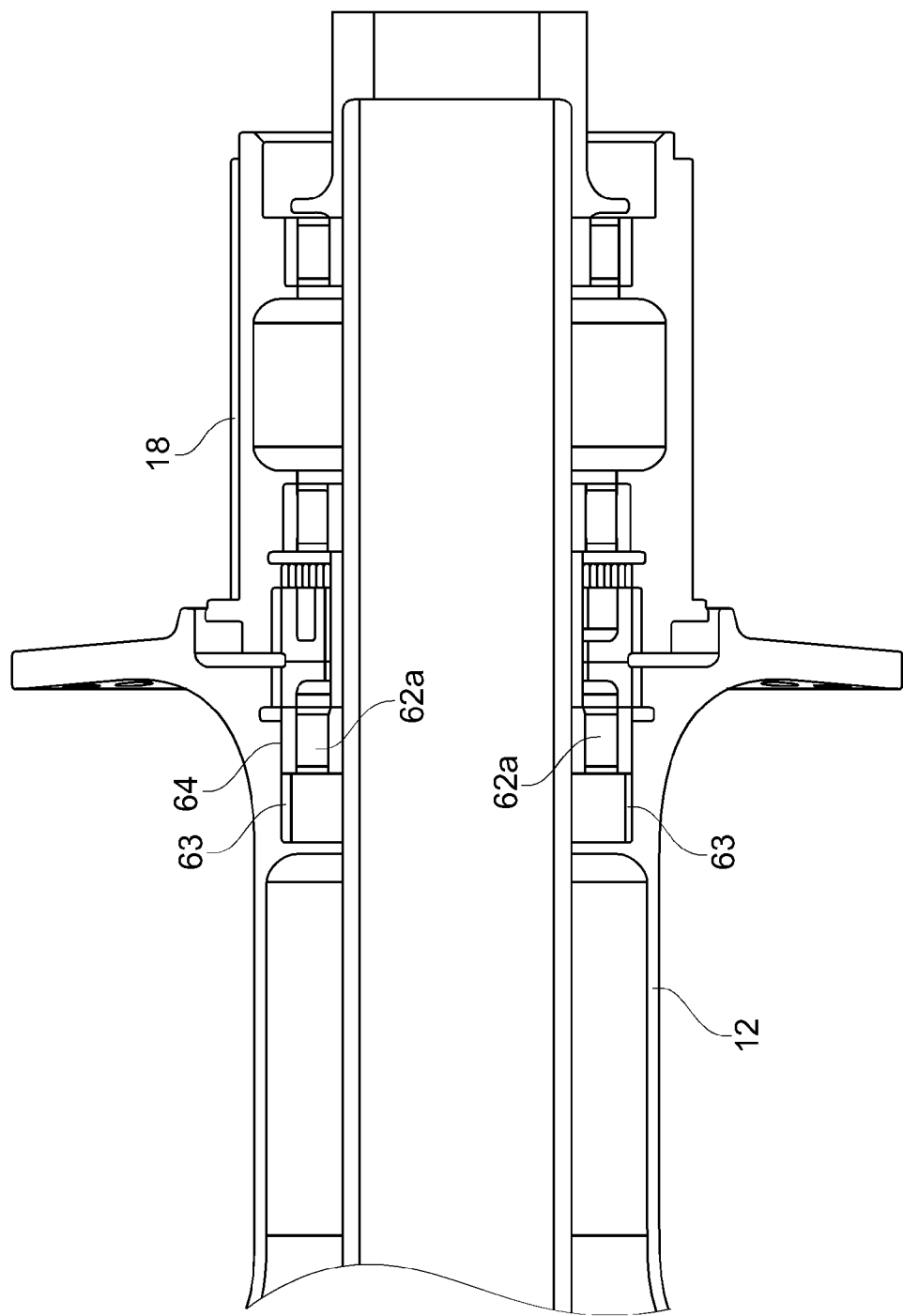
FIG. 17 shows another embodiment of a hub bearing according to the invention.

According to another embodiment, for each hub bearing one of the two bearing units is replaceable by a spacer insert 63 (shown in FIG. 17). To ensure the most favorable leverage based on the introduction of force into the axle body 12, each bearing unit situated facing the hub center is replaceable.

A wheel may thus be provided in which the bearings may be adapted for different purposes.

The design according to the invention of two bearing units for each hub bearing allows a significant reduction in weight, since for the same load capacity, the two bearing units may be designed to be much smaller and therefore lighter compared to the single bearing units common heretofore. Rear wheel hubs may thus be provided in particular for wheels which are also usable for the extremely harsh conditions of downhill travel in mountain biking.

Due to the replaceability with the spacing insert 63, the weight of the wheel may be further reduced when the wheel, i.e., the hub bearings, is/are not subjected to such high load. For example, lighter cyclists may replace one of the bearing units with the spacing insert for each hub bearing, since one bearing unit is sufficient for the lower body weight.

For use strictly on streets or travel on fairly level surfaces, it is also possible for cyclists of normal weight to remove one bearing unit in order to further reduce the weight of the hub.

To meet the demand for further options in weight reduction, it is also possible for expert-level mountain biking cyclists to use only one bearing unit, even for higher loads, in which case, however, greater wear is to be expected. For example, it may be possible to participate in a race with only one bearing unit, wherein after the race the bearing actually subjected to overload is replaced.

Figure 6:
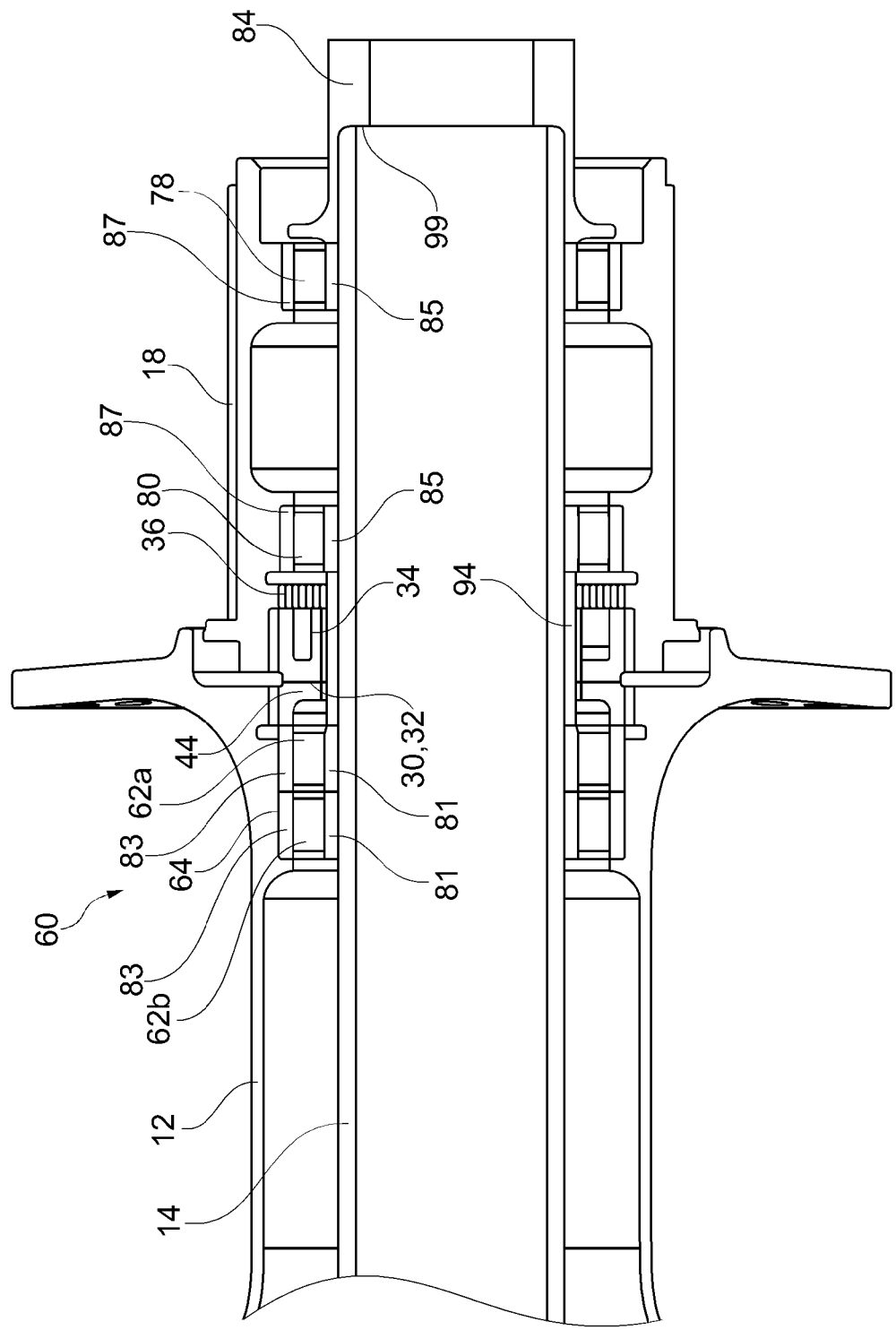
FIG. 6 shows an enlarged detail of the sectional illustration according to FIG. 2.

It is apparent from FIG. 2 as well as FIG. 6 that the first and the second bearing holders in the hub body 12 are each designed as axially extending cylindrical cavities 66 which are open on the one end face over the entire cross-sectional area for insertion of the bearings, i.e., in a horizontal view of the page in FIG. 6, open on the right side. On the other side the cylindrical cavity is delimited by a shoulder 70 as an axial stop for the bearings.

These design features have a similar design for the two hub bearings, i.e., on both sides of the hub; the illustration of the oppositely situated bearing is omitted in FIG. 6.

With reference to FIG. 2, the hub body 12 has a first end-face region 70 and a second end-face region 72, the second end-face region being oriented facing the freewheel body 18. The freewheel body 18 has a first end-face region 74 and a second end-face region 76, the second end-face region 76 being oriented facing the freewheel body 18.

The second bearing device 20 comprises a first freewheel bearing 78 and a second freewheel bearing 80, the first freewheel bearing being situated in the region of the first end-face region 74, and the second freewheel bearing 80 being situated in the region of the second end-face region 76.

The first hub bearing 58 is situated in the first end-face region 70 of the hub body 12, and the second hub bearing 60 is situated in the second end-face region 72 of the hub body 12.

The axle body 14 has a first end cap 82 and a second end cap 84, the second end cap being situated on the side of the freewheel mechanism, i.e., the sprocket side, and the first end cap being situated on the other, opposite end of the axle.

The first end cap 82 is used as a first axial stop 86 for the first hub bearing 58, and the second end cap 84 is used as a second axial stop 88 for the first freewheel bearing 78. In the other direction, a first axial hub stop 90 for the first hub bearing 58 is provided at the hub body.

The first and second hub bearings 58, 60 each have an inner ring 81 and an outer ring 83. For example, each hub bearing is axially held with the inner ring 81 on one side in a first holding direction with respect to the hub axis. For example, each hub bearing is held with the outer ring 83 on one side in a second holding direction, opposite that of the first holding direction, with respect to the hub body. The first holding direction of the second hub bearing extends opposite the first holding direction of the first hub bearing.

The term "inner ring" refers to the inner raceway, i.e., the inner bearing surface of the particular bearing, and "outer ring" refers to the outer raceway, i.e., the outer bearing surface of the bearing. The term "one-sided holding" refers to holding in one direction; i.e., for one-sided holding a hold is provided in one direction, while a motion is possible in the other direction.

In FIG. 6, the hub bearing situated in the direction of the freewheel is held on the outer ring 83 from the left by a stop, and on the right is held on the inner ring 81 by a sleeve 94.

It is pointed out that FIG. 6 also shows the aspect of a two-part hub bearing, which, however, does not necessarily have to be used with the one-sided stop design of the bearings.

The first and second freewheel bearings 78, 80 likewise have an inner ring 85 and an outer ring 87. For example, each freewheel bearing is axially held with the inner ring 85 on one side in a first holding direction with respect to the hub axis. For example, each freewheel bearing is held with the outer ring 87 on one side in a second holding direction, opposite the first holding direction, with respect to the hub body. The first holding direction of the second freewheel bearing extends opposite the first holding direction of the first freewheel bearing.

In FIG. 6, the freewheel bearing situated in the direction of the hub body is held on the inner ring 85 from the left by the sleeve 94, and on the right is held on the outer ring 87 by a stop of the freewheel body. The other, i.e., right, freewheel bearing is held on the outer ring 87 from the left by a stop on the freewheel body, and on the right is held on the inner ring 85 by the end cap 84. For the first freewheel bearing 78, a first axial freewheel stop 91 is provided at the freewheel body 18 which, in addition to the second end cap 84, holds the freewheel bearing in the other direction. For the second freewheel bearing 80, a second axial freewheel stop 92 is provided at the freewheel body 18 which acts on the freewheel body 18 in the direction opposite from the first axial freewheel stop 91. In the direction opposite from the second freewheel stop 92, at the inner region, i.e., the region of the axle body 14, the second freewheel bearing 80 is held by the sleeve 94 which is provided between the second freewheel bearing 80 and the second hub bearing 60, the sleeve 94 acting as an axial stop in opposite directions for both bearings, i.e., the second freewheel bearing and the second hub bearing; i.e., the sleeve 94 forms a first sleeve stop 96 for the second freewheel bearing, and forms a second sleeve stop 98 as an axial stop for the second hub bearing 60. In the other direction, the second hub bearing 60 is held by a second hub stop 100 provided at the hub body 12.

This design allows the two hub bearings for mounting the rear wheel hub to be pushed onto the axle body 14, since the latter is provided with a continuous lateral surface, i.e., comprises no stops.

According to another aspect of the invention, the end caps are placed on the ends of the hub axle, and with their inner side 99 contact the end-face end of the hub axle in such a way that that in the mounted state, a clamping force axially acting on the rear wheel hub is transmissible from the end caps via the axle body.

A compensating element, not shown in greater detail, may be provided between the inner sides 99 and the end faces of the axle body 14 in order to compensate for positive inaccuracies in the bearing holding. To compensate for negative inaccuracies, a compensating element (not shown in greater detail) may be provided between the inner raceways of the hub bearings and freewheel bearings situated in the region of the ends of the axle body.

Thus, the support in the axial direction is held via the first end cap 82, which forms the first axial stop 86 by means of the first hub bearing 58, which is held on the other side by the third stop, which is provided as a shoulder on the hub body 12. The holding force is conducted via the hub body to the eighth axial stop 100, which holds the second hub bearing 60 on one side, the second hub bearing being held on the opposite side by the seventh axial stop 98, which is provided at the sleeve 94. The sleeve 94 transmits the holding force to the sixth axial stop 96, which holds the second freewheel bearing 80 on one side, the second freewheel bearing 80 being held on the opposite side by the fifth axial stop, which is provided as an internal shoulder at the freewheel body 18. The freewheel body 18 further transmits or conducts the holding force to the fourth axial stop 90, which holds the first freewheel bearing 78 on one side. On the other side the first freewheel bearing 78 is held by the second axial stop 88, which is formed by the second end cap 84.

Since both end caps each rest with their inner sides 99 against the end-face ends of the axle, this floating holding with respect to the axle body itself requires high precision, i.e., very low tolerance, in the manufacture of the individual components. Given manufacture with appropriate precision, holding of the individual components without play is thus possible; in other words, the bearings are held in the axial direction with a precisely defined holding force.

If inaccuracies still result, i.e., if there is a need to accommodate tolerances, compensating elements may be provided. Imprecision may already be discovered during installation or manufacture, since during mounting of the end caps, either there is easily detectable play when one or more of the components have a linear dimension that is too small with respect to the rotational axis 24; or it is difficult to turn the hub body about the axle body when one or more components have a linear dimension that is too large with respect to the rotational axis 24, since the bearings are each inwardly and outwardly held in only one, i.e., opposite, direction. If, for example, the projections on the hub body are too far apart, the two hub bearings would be axially clamped, since the inner raceway would be pretensioned toward the center and the outer raceway would be pretensioned toward the outside, which in particular for a groove ball bearing results in noticeably higher frictional resistance.

Imprecision in manufacture and in assembly may thus be easily detected at the installed hub, so that compensation using compensating elements, for example compensating disks or also replacement of the components, may be performed in the manufacturing facility; i.e. sorting out can take place. In designs common heretofore, in which the imprecision is not as easily detectable, the biasing forces in the hub bearings cause greater wear over time, which may then result in premature failure of the rear wheel hub.

FIG. 2 indicates that the end caps are designed for use with a quick-release clamping device, which is not illustrated in greater detail.

Since the end caps are replaceable according to the invention, the rear wheel hub 10 according to the invention may also be used for a full-floating or through axle system, as indicated in FIG. 2 by end caps with dotted lines (also see FIG. 6). For this purpose, the end caps have an end-face stop for resting against the inner sides of the dropouts. The end caps also have a clear opening through which a full-floating axle may be guided, which at one end has a stop for lying against the outer side of the dropout, and an external thread for screwing into an internal thread on the other dropout (not illustrated in greater detail).

FIG. 7 shows the two spur gearings 30, 32 provided at the first disk body 34 (right side in FIG. 7) and at the second disk body 44 (left side in FIG. 7). As previously mentioned, the second disk body 44 is immovably held at the hub body 12, while the first disk body 34 is held at the freewheel body 18 in a floating manner, so that the first disk body 34 may be moved toward and away from the second disk body 44.

Figure 8:
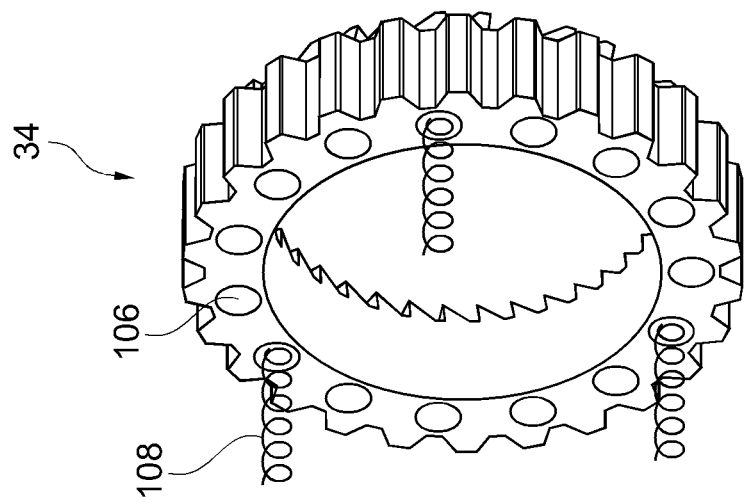
FIG. 8 shows a freewheel arrangement according to another exemplary embodiment.
Figure 8:
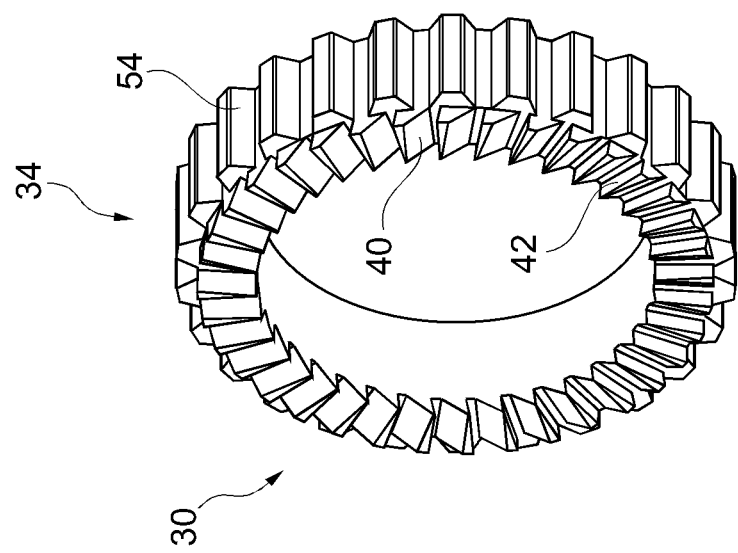

FIG. 8 shows a first embodiment of the first disk body 34 in a view from each of its two sides. The end-face toothing provided on the one side is used to engage with the second disk body 44. The radially circumferential projections are used to engage with axially extending grooves on the freewheel body, previously mentioned with regard to FIGS. 4 and 5. The right half of the figure shows the first disk body 34 from the back side. The disk body 34 has a plurality of receptacles 106 designed as blind boreholes. Multiple springs 108 may be inserted into this borehole 106 which push the first freewheel body, as a pretensioning device 36, in the direction of the second spur gearing of the second disk body 44. As the result of multiple, in particular at least three, springs, a uniform pressure is exerted on the first disk body 34 in the axial direction which counteracts tilting of the disk body. The springs 108 may be inserted into the borehole 106 in such a way that they are held captive at the first disk body 34 so that they are not lost during disassembly, for example for maintenance purposes.

For example, the springs 108 may be designed as conical springs in order to occupy as little space as possible when compressed.

At their opposite end the springs are supported on a projection of the freewheel body 18, which is not shown.

Figure 9:
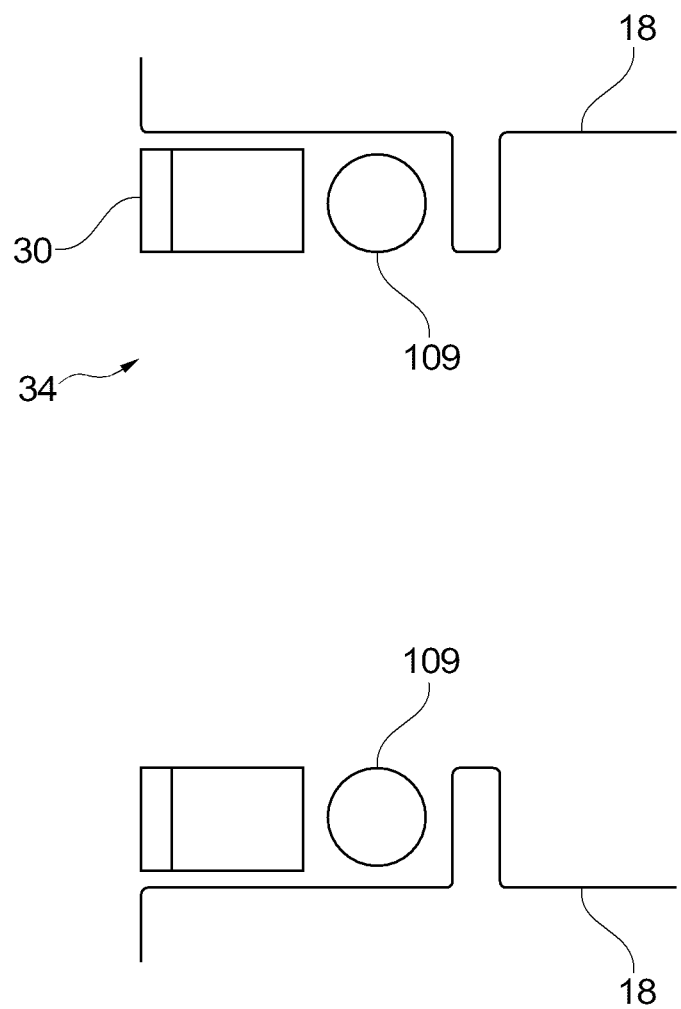
FIG. 9 shows an exemplary embodiment of a pretensioning device according to the invention.

As an alternative to the design using springs, preferably an elastic ring 109 may be provided, which is situated in the receptacle in the freewheel body between a stop and the first disk body, and which thus acts as a pretensioning device (see FIG. 9).

Figure 11:
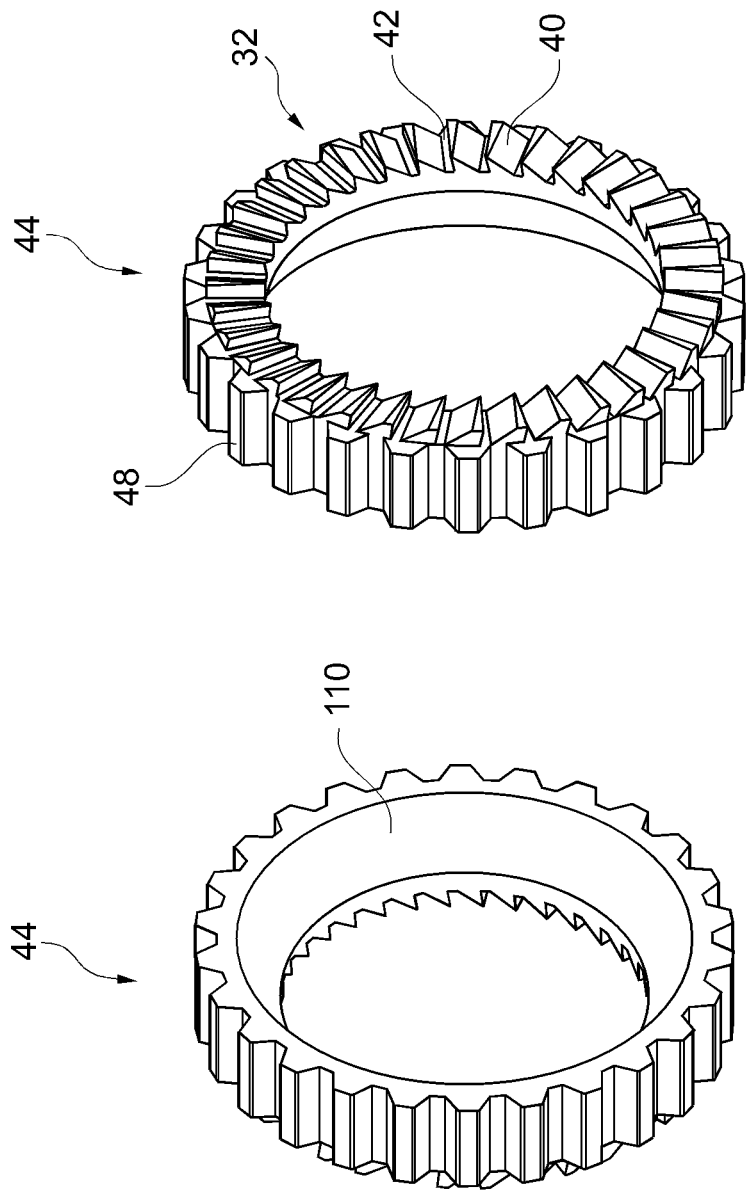
FIG. 11 shows another embodiment of a freewheel arrangement according to the invention.
Figure 12:
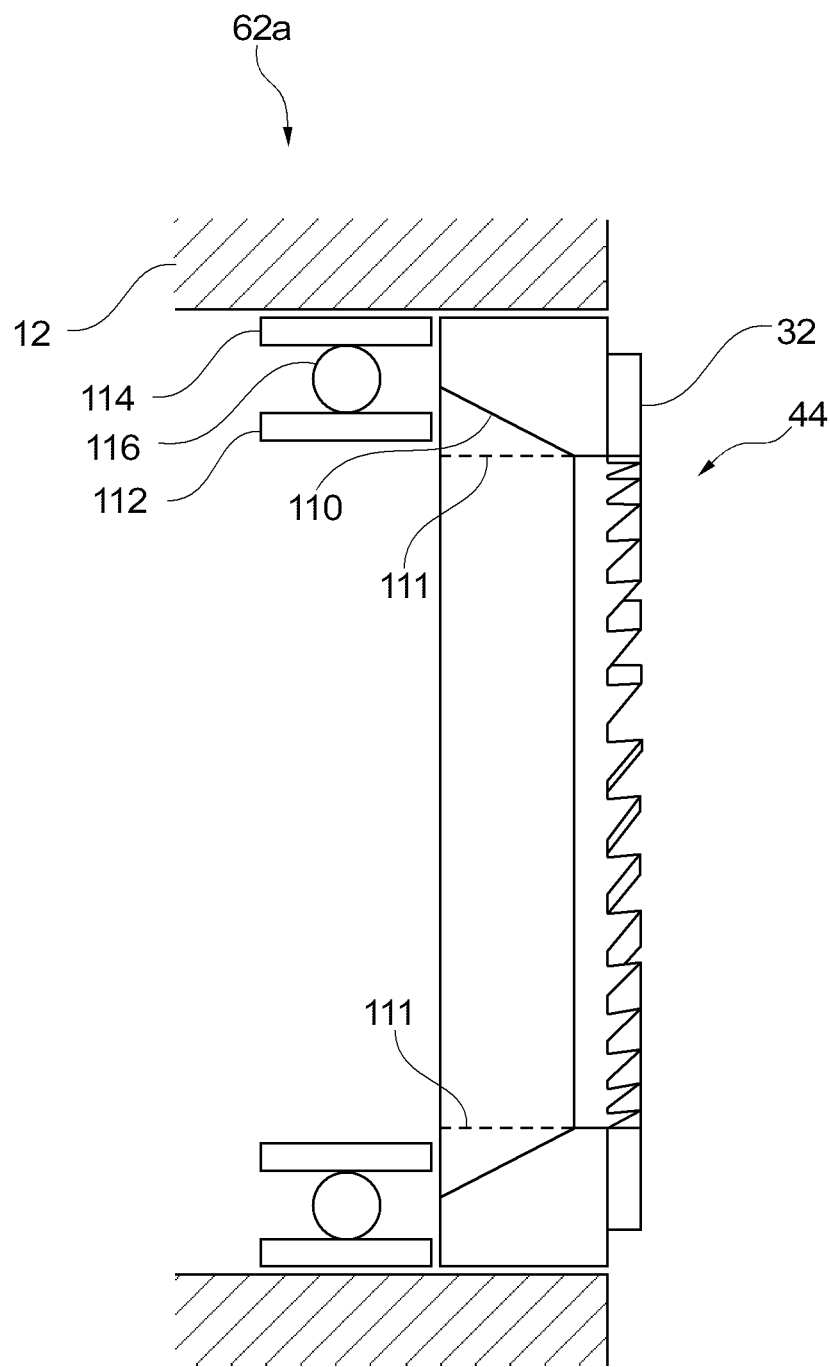
FIG. 12 shows a cross section of a freewheel arrangement according to FIG. 9.

For further weight reduction, another embodiment is shown in FIG. 11 in which the second disk body 44 is designed with a reduced cross-sectional area. As shown in the cross-sectional view in FIG. 12, the region behind the spur gearing is provided with a bevel 110. The removed material, i.e., the material reduction, is indicated by a dashed line 111. The spur gearing itself as well as the circumferential radial toothing remain unchanged. Besides the weight savings, this bevel has another advantage, likewise shown in FIG. 12. One of the two bearing units 62a of the second hub bearing 60 is schematically indicated. The bearing unit has an inner raceway 112 and an outer raceway 114, between which a rolling element 116 is indicated. The bearing may be designed as a groove ball bearing, so that the rolling element 116 involves ball elements which are held in grooves, not illustrated, in the outer and inner raceways.

Since the outer raceway 114 is immovable with respect to the hub body 12, i.e., rotates with the hub body, which is also the case for the second disk body 44, which at the outer radial projections engages with the grooved structure of the hub body, the two parts, i.e., the outer raceway 114 and the second disk body 44, are able to contact one another in the region of the end face of the outer raceway.

Because the inner raceway rotates with the hub axle, and thus also in relation to the second disk body 44, a minimum distance must be present between the end of the inner raceway 112 and the second disk body 44. Since the second disk body 44 is provided with the bevel 110, this distance is adequately ensured, which would not be the case for the square-cornered cross-sectional shape indicated by the dashed line 111. For a completely realized cross section in the sense of the dashed line 111 without the bevel 110, the two components, i.e., the bearing and the second disk body, would have to be situated at a distance from one another.

Figure 13:
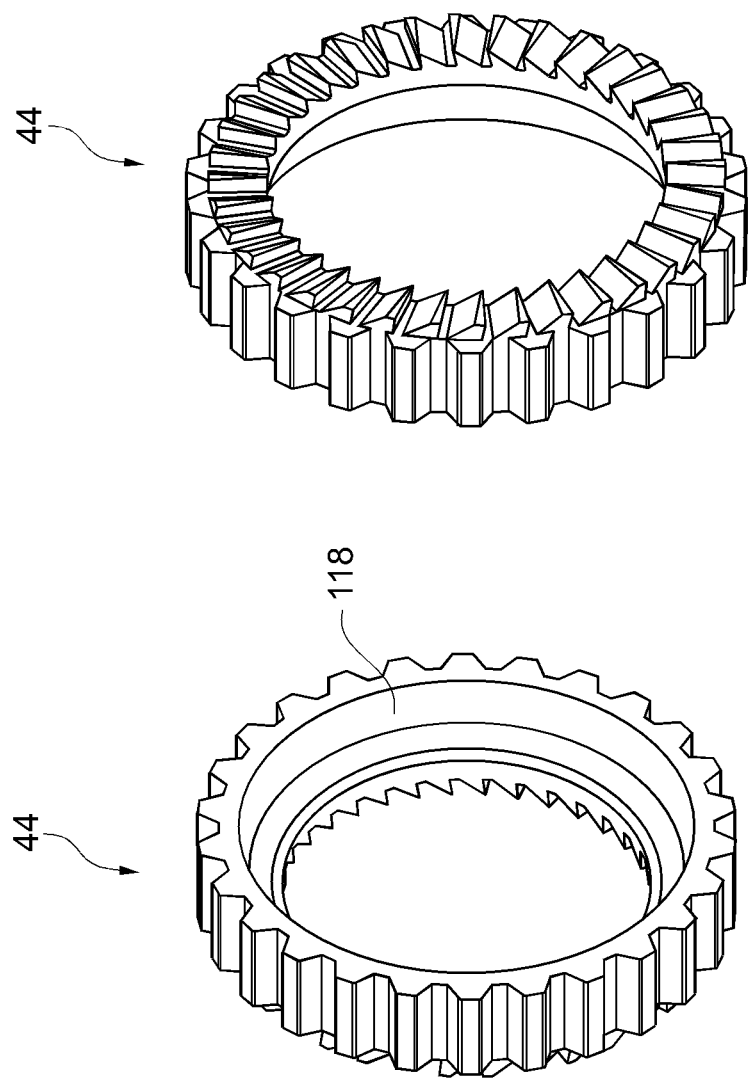
FIG. 13 shows another embodiment of a freewheel arrangement according to the invention.

FIG. 13 shows another embodiment of the second disk body 44 in which, instead of the bevel, an L-shaped cross section having an even greater cross-sectional reduction 118 is provided.

Figure 10:
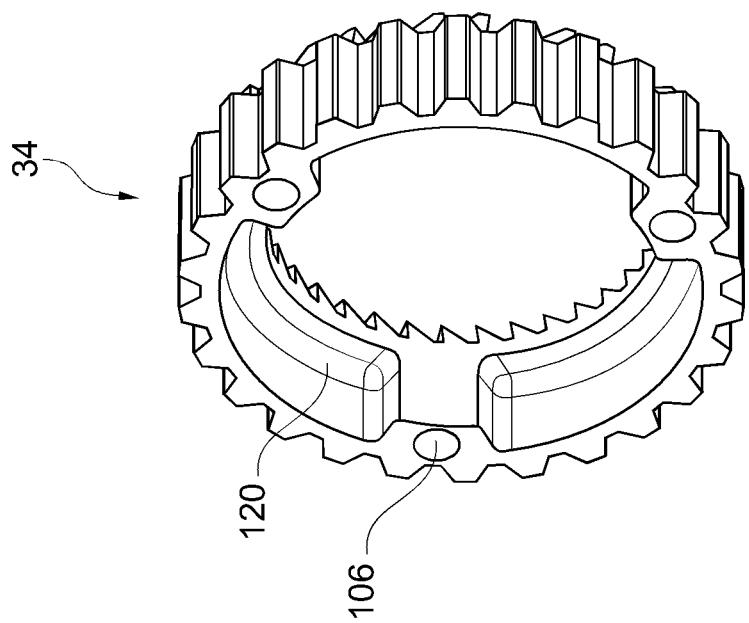
FIG. 10 shows another embodiment of a freewheel arrangement according to the invention.
Figure 10:
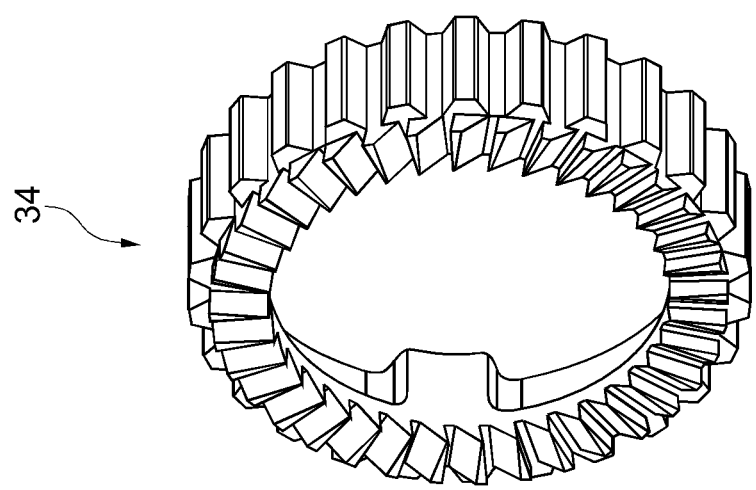

FIG. 10 shows another embodiment of the first disk body 34 in which an L-shaped cross section of the disk body with corresponding recesses 120 is likewise provided, a full cross section being provided at at least three locations to allow provision of the boreholes 106, mentioned with regard to FIG. 8, in this region.

Figure 18:
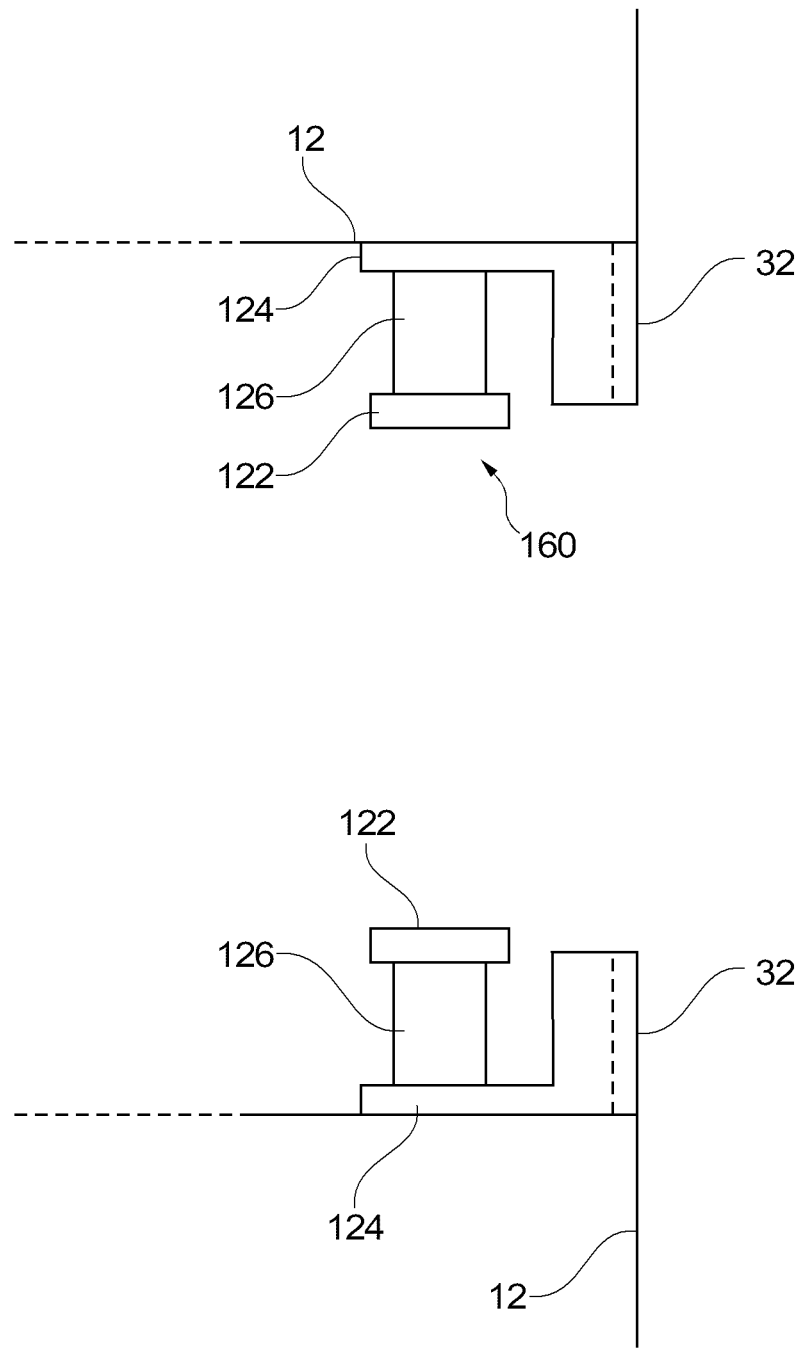
FIG. 18 shows another embodiment of a hub bearing and a spur gearing according to the invention.

FIG. 18 shows an embodiment of a second hub bearing 160 having an inner raceway 122 and an outer raceway 124, between which a roller element 126 is provided; this is preferably a groove ball bearing, so that the rolling element 126 is a ball element which is held between the two raceways, the raceways being designed as grooved structures (not illustrated) in order to hold the rolling element 126 in the axial direction. The outer raceway 124 is designed in one piece with the second spur gearing 32; i.e., the raceway 124 has an L-shaped cross section, which allows the spur gearing 32 to be provided at the end-face region facing in the axial direction. At its outer circumferential surface the raceway 124 is provided with the previously mentioned projections, which engage with recesses in the hub body to allow a rotational motion to be transmitted to the hub body.

In addition to the further reduction in weight and the simplified installation, in particular the installation space may be reduced, thus allowing the second hub bearing to be situated as far as possible from the freewheel body, resulting in more favorable leverage.

Figure 19:
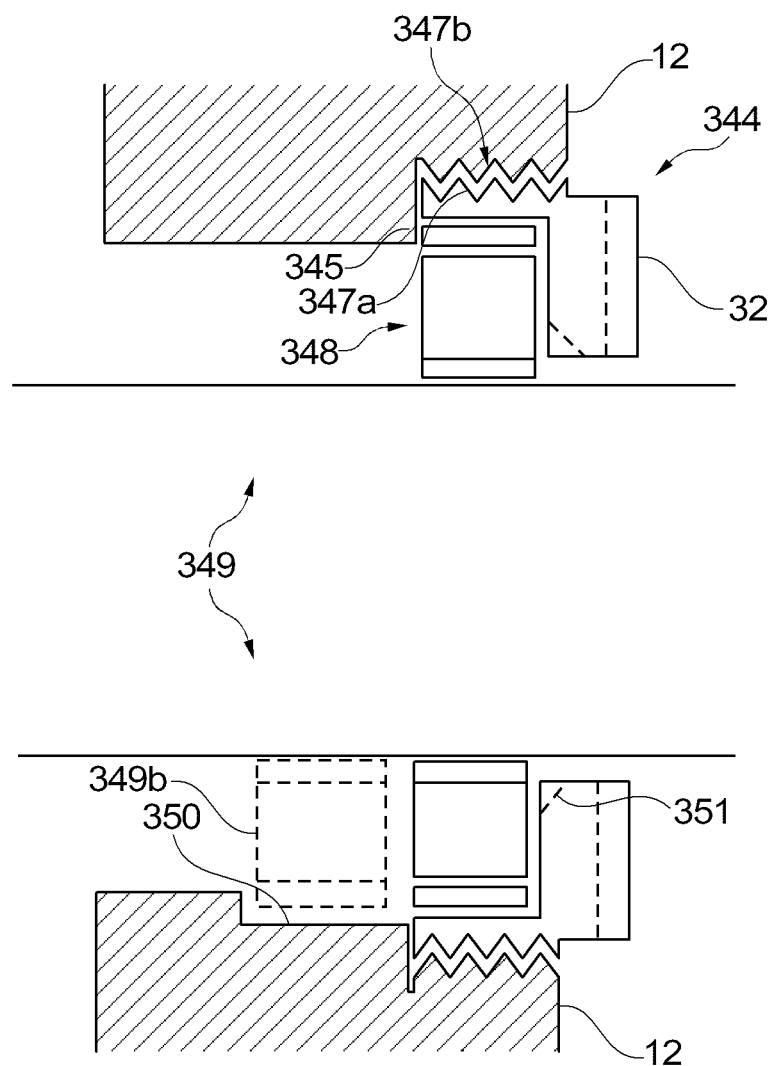
FIG. 19 shows another embodiment of a hub bearing and a spur gearing according to the invention.

FIG. 19 shows an embodiment in which a second disk body 344 having a spur gearing 32 is screwed into a receiving opening 346 in the hub body 12, for which purpose the disk body 344 has an external thread 347a, and the receiving opening has an internal thread 347b which is provided with a stop 345. To situate the bearing of the hub as far as possible from the end of the axle, i.e., to allow the force to be introduced into the axle body 14 as close as possible to its support in the frame elements (not shown), the second disk body 344 has a receptacle 348 as a seat for a hub bearing 349. When the inside diameter of the receptacle 348 is correspondingly equal to a receptacle 350 in the hub body, a second bearing unit, illustrated in dashed lines only in the bottom half of FIG. 19, may also be provided.

The embodiment shown is also suitable for holding two bearing units in the receptacle 348 in the second disk body 344, when the receptacle has an appropriate depth.

The second disk body 344 may be provided with a bevel 351, indicated by a dashed line, at its inner end to avoid contact with the inner raceway of the hub bearing.

The design variants described in the individual figures may be combined in different ways, which may result in effects which go beyond the mere addition of the particular individual effects. In particular, the claim features of the independent claims may be combined with one another.

The invention claimed is:

1. Rear wheel hub for a bicycle, comprising:
a hub body;
an axle body;
a first bearing device between the axle body and the hub body, the hub body being held in relation to the axle body so as to be rotatable about a rotational axis;
a freewheel body for accommodating at least one sprocket;
a second bearing device between the axle body and the freewheel body, the freewheel body being held in relation to the axle body so as to be rotatable about the rotational axis; and
a freewheel arrangement between the freewheel body and the hub body, which in a first rotational direction about the rotational axis establishes a coupling between the freewheel body and the hub body, and in a second rotational direction which is opposite that of the first rotational direction, the freewheel body is freely rotatable with respect to the hub body, the freewheel arrangement comprising a first spur gearing and a second spur gearing which face one another and are held so that they are axially movable with respect to one another, one spur gearing being rotationally fixed with respect to the hub body, and the other spur gearing being rotationally fixed with respect to the freewheel body;

the first bearing device having a first hub bearing and a second hub bearing; wherein each hub bearing comprises an inner ring and an outer ring; and wherein each hub bearing is axially held with the inner ring on only one side in a first holding direction with respect to the axle body, and wherein each hub bearing is axially held with the outer ring on only one side in a second holding direction, opposite that of the first holding direction, with respect to the axle body, the first holding direction of the second hub bearing extending opposite to the first holding direction of the first hub bearing.

2. Rear wheel hub according to claim 1, wherein the second bearing device comprises a first freewheel bearing and a second freewheel bearing, wherein each freewheel bearing comprises an inner ring and an outer ring; and wherein each freewheel bearing is axially held with the inner ring on one side in a third holding direction with respect to the hub axle, and wherein each freewheel bearing is axially held with the outer ring on one side in a fourth holding direction, opposite that of the third holding direction, with respect to the freewheel body, the third holding direction of the second freewheel bearing extending opposite to the third holding direction of the first freewheel bearing.

3. Rear wheel hub according to claim 1, wherein a first end cap and a second end cap are placed on opposite ends of the axle body contacting opposite end-face ends of the axle body such that, in the mounting state, a clamping force axially acting on the rear wheel hub is transmissible from the end caps via the axle body.

4. Rear wheel hub according to claim 1, wherein the first and the second hub bearings each comprise two bearing units, the hub body for the first and the second hub bearings having a first bearing holder and a second bearing holder, each being designed for accommodating the two bearing units, whereby for each hub bearing one of the two bearing units is replaceable with a spacer unit.

5. Rear wheel hub according to claim 1, wherein the first spur gearing is provided on a first disk body which is held with respect to the rotational axis in a floating manner, and is pushed in the direction of the second spur gearing by a pretensioning device, and the second spur gearing is immovably held, at least in the pretensioning direction; and wherein the second spur gearing is provided on a second disk body which is screwed into a receiving opening in the hub body, the direction of screwing corresponding to the coupling direction.

6. Rear wheel hub according to claim 1, wherein the first spur gearing is provided on a first disk body which is held with respect to the rotational axis in a floating manner, and is pushed in the direction of the second spur gearing by a pretensioning device;

wherein the pretensioning device comprises an elastically resetting device, which is supported on the freewheel body and which pushes the first disk body in the direction of the second spur gearing; and wherein the elastically resetting device is provided such that the first disk body is evenly pushed in the direction of the second spur gearing and a biasing force against a tilting of the first disk body is generated.

7. Rear wheel hub according to claim 6, wherein the pretensioning device comprises an elastic ring body, which is provided between the freewheel body and the first disk body, and which rests on the first disk body.

8. Rear wheel hub according to claim 1, wherein each of the first hub bearing and the second hub bearing is situated at one of the two end-face regions of the hub body; and wherein the hub bearing which is oriented facing the freewheel body has an inner raceway and an outer raceway, and the second spur gearing is designed in one piece with the outer raceway.

9. Wheel for a bicycle, comprising:

a rim;

a hub; and a spoke body;

the spoke body connecting the rim to the hub; and the hub being designed as a rear wheel hub according to claim 1.

10. Bicycle comprising a wheel according to claim 9.

* * * * *